US008780459B2

United States Patent
Chen et al.

(10) Patent No.: US 8,780,459 B2
(45) Date of Patent: Jul. 15, 2014

(54) OPTICAL IMAGING LENS SYSTEM

(75) Inventors: Chun-Shan Chen, Taichung (TW); Hsin-Hsuan Huang, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 107 days.

(21) Appl. No.: 13/592,046

(22) Filed: Aug. 22, 2012

(65) Prior Publication Data

US 2013/0265650 A1  Oct. 10, 2013

(30) Foreign Application Priority Data

Apr. 6, 2012 (TW) .............................. 101112176 A

(51) Int. Cl.
 *G02B 13/18* (2006.01)
 *G02B 9/60* (2006.01)
 *G02B 13/00* (2006.01)

(52) U.S. Cl.
 CPC .............. *G02B 13/0045* (2013.01); *G02B 9/60* (2013.01); *G02B 13/18* (2013.01)
 USPC .............................. 359/714; 359/767; 359/769

(58) Field of Classification Search
 CPC .... G02B 13/18; G02B 13/00; G02B 13/0045; G02B 9/60
 USPC .......... 359/714, 753, 754, 763–764, 767–769
 See application file for complete search history.

(56) References Cited

U.S. PATENT DOCUMENTS

| 7,355,801 | B2 | 4/2008 | Chen et al. | |
|---|---|---|---|---|
| 8,310,767 | B2 * | 11/2012 | Huang et al. | 359/713 |
| 2009/0122423 | A1 * | 5/2009 | Park et al. | 359/764 |
| 2011/0157725 | A1 * | 6/2011 | Baba | 359/740 |
| 2012/0154929 | A1 * | 6/2012 | Tsai et al. | 359/714 |

* cited by examiner

*Primary Examiner* — Alicia M Harrington
*Assistant Examiner* — Marin Pichler
(74) *Attorney, Agent, or Firm* — Morris, Manning & Martin, LLP; Tim Tingkang Xia, Esq.

(57) ABSTRACT

This invention provides an optical imaging lens system in order from an object side to an image side comprising five non-cemented lens elements with refractive power: a first lens element with positive refractive power having a convex object-side surface; a second lens element with positive refractive power; a third lens element with negative refractive power, and both surfaces being aspheric; a fourth lens element having a convex image-side surface, and both surfaces being aspheric; and a plastic fifth lens element having a concave image-side surface, both surfaces being aspheric, and at least one inflection point is formed on at least one of the surfaces thereof. By such arrangement, the refractive power of the optical imaging lens system can be effectively distributed with improved light converging power so that the total track length can be shortened effectively, and the aberration of system can be corrected to facilitate high image quality.

25 Claims, 23 Drawing Sheets

OPTICAL IMAGING LENS SYSTEM

CROSS-REFERENCE TO RELATED APPLICATION

This non-provisional application claims priority under 35 U.S.C. §119(a) on Patent Application No. 101112176 filed in Taiwan (R.O.C.) on Apr. 6, 2012, the entire contents of which are hereby incorporated by reference.

BACKGROUND

1. Technical Field

The present disclosure relates to an optical imaging lens system, and more particularly, to a compact optical imaging lens system used in electronic products or an optical imaging lens system in three-dimensions imaging.

2. Description of the Prior Art

In recent years, with the popularity of portable electronic products having photographing function, the demand of compact imaging lens system has grown. Generally, the sensor of a general photographing camera is none other than CCD (Charge Coupled Device) or CMOS device (Complementary Metal Oxide Semiconductor device). Furthermore, advances in semiconductor manufacturing technology have allowed the pixel size of sensors to be reduced and therefore lead compact imaging lens systems to higher resolution. In the meantime, the demand for better image quality is also increased.

A conventional compact photographing lens equipped in a portable electronic product, as the lens system with four lens elements disclosed in U.S. Pat. No. 7,355,801; wherein the invention is an image pickup lens assembly with a structure of three lens groups, wherein the third lens group thereof is configured with only one lens element and thereby the ability to correct aberration and chromatic aberration is not enough. However, due to the popularity of high standard mobile devices such as smart phones and PDAs (Personal Digital Assistant) driving the rapid improvements in high resolution and image quality of the current compact imaging lens systems, conventional four lens elements systems no longer satisfy the higher level camera modules. Furthermore, with the current trend for high performance and compact design in electronic products, the need for high image quality and a moderate total track length imaging optical lens assembly is very crucial in compact portable electronic products.

SUMMARY

The present disclosure provides an optical imaging lens system comprising five non-cemented lens elements with refractive power, in order from an object side to an image side: a first lens element with positive refractive power having a convex object-side surface; a second lens element with positive refractive power; a third lens element with negative refractive power, and both the object-side and image-side surfaces thereof being aspheric; a fourth lens element having a convex image-side surface, and both the object-side and image-side surfaces thereof being aspheric; and a plastic fifth lens element having a concave image-side surface, with both the object-side and image-side surfaces thereof being aspheric, and having at least one inflection point positioned on at least one of the object-side and image-side surfaces thereof; wherein a maximal effective radial distance on the image-side surface of the fifth lens element is SD52, a maximal effective radial distance on the image-side surface of the fourth lens element is SD42, an axial distance between the object-side surface of the first lens element and the image-side surface of the fifth lens element is TD, an axial distance between the third lens element and the fourth lens element is T34, an axial distance between the second lens element and the third lens element is T23, a distance between a non-axial critical point of the image-side surface of the fifth lens element and the optical axis is Yp52, and they satisfy the following relations: $0.25<(SD52-SD42)/TD<0.60$; $0.1<T34/T23<2.8$; and $0.3<Yp52/SD52<0.95$.

On the other hand, the present disclosure provides an optical imaging lens system comprising five non-cemented lens elements with refractive power, in order from an object side to an image side: a first lens element with positive refractive power having a convex object-side surface; a second lens element with positive refractive power; a third lens element with both the object-side and image-side surfaces thereof being aspheric; a fourth lens element with both the object-side and image-side surfaces thereof being aspheric; and a plastic fifth lens element having a concave image-side surface, with both the object-side and image-side surfaces thereof being aspheric, and having at least one inflection point positioned on at least one of the object-side and image-side surfaces thereof; wherein the optical imaging lens system further comprises an image plane; an axial distance between the object-side surface of the first lens element and the image plane is TTL, a maximum image height of the optical imaging lens system is ImgH, an axial distance between the third lens element and the fourth lens element is T34, an axial distance between the second lens element and the third lens element is T23, a distance between a non-axial critical point of the image-side surface of the fifth lens element and an optical axis is Yp52, a maximal effective radial distance on the image-side surface of the fifth lens element is SD52, and they satisfy the following relations: $TTL/ImgH<1.6$; $0.1<T34/T23<2.8$; and $0.3<Yp52/SD52<0.95$.

On the other hand, the present disclosure provides an optical imaging lens system comprising five non-cemented lens elements with refractive power, in order from an object side to an image side: a first lens element with positive refractive power having a convex object-side surface; a second lens element with positive refractive power; a third lens element with both the object-side and image-side surfaces thereof being aspheric; a fourth lens element with both the object-side and image-side surfaces thereof being aspheric; and a plastic fifth lens element having a concave image-side surface, with both the object-side and image-side surfaces thereof being aspheric, and having at least one inflection point positioned on at least one of the object-side and image-side surfaces thereof; wherein half of the maximal field of view of the optical imaging lens system is HFOV, a curvature radius of the image-side surface of the fifth lens element is R10, a focal length of the optical imaging lens system is f, a distance between a non-axial critical point of the image-side surface of the fifth lens element and an optical axis is Yp52, a maximal effective radial distance on the image-side surface of the fifth lens element is SD52, and they satisfy the following relations: $40\ deg<HFOV<55\ deg$; $0<R10/f<0.4$; and $0.3<Yp52/SD52<0.95$.

By such arrangement, the distribution of refractive power of the optical imaging lens system can be effectively dispersed and thereby the light gathering power of system can be improved so that the total track length of the optical imaging lens system can be shortened effectively, and the aberration of system can be corrected to facilitate high image quality.

In the aforementioned optical imaging lens system, the first lens element with positive refractive power provides the majority of the refractive power of the optical imaging lens system; when the second lens element has positive refractive power, the refractive power of the optical imaging lens system can be effectively distributed to prevent the excessive increment in the spherical aberration caused by the excessively strong positive refractive power of each individual lens element. In addition, when the first lens element and the second lens element both have positive refractive power, the light converging power of the optical imaging lens system can be strengthened so that the total track length can be shortened effectively.

In the aforementioned optical imaging lens system, when the first lens element has a convex object-side surface, the positive refractive power of the lens elements can be strengthened and thereby the total track length of the lens assembly can be reduced even more. When at least one inflection is formed on the fifth lens element, the angle at which light projects onto the image sensor from the off-axis field can be effectively reduced so that the sensing efficiency of the image sensor can be improved and the off-axis aberration can be corrected. Furthermore, the arrangement of the lens elements is more suitable for assembly of the optical imaging lens system and favorably avoiding the difficulty during assembling when there is air distance between every two lens elements of the present optical imaging lens system.

DETAILED DESCRIPTION OF THE PREFERRED EMBODIMENTS

Figure 1A:
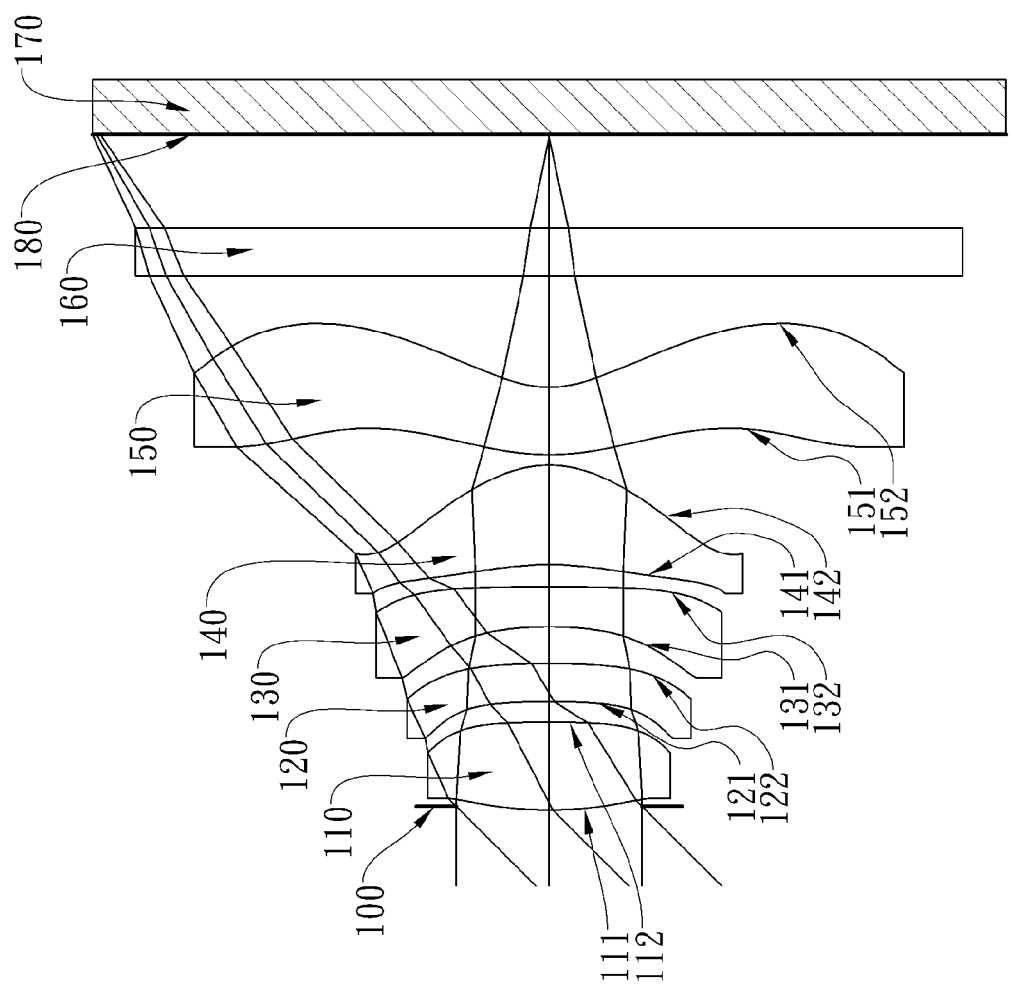
FIG. 1A shows an optical imaging lens system in accordance with the first embodiment of the present disclosure.

The present disclosure provides an optical imaging lens system comprising five non-cemented lens elements with refractive power, in order from an object side to an image side: a first lens element with positive refractive power having a convex object-side surface; a second lens element with positive refractive power; a third lens element with negative refractive power, and both the object-side and image-side surfaces thereof being aspheric; a fourth lens element having a convex image-side surface, and both the object-side and image-side surfaces thereof being aspheric; and a plastic fifth lens element having a concave image-side surface, with both the object-side and image-side surfaces thereof being aspheric, and having at least one inflection point positioned on at least one of the object-side and image-side surfaces thereof; wherein a maximal effective radial distance on the image-side surface of the fifth lens element is SD52, a maximal effective radial distance on the image-side surface of the fourth lens element is SD42, an axial distance between the object-side surface of the first lens element and the image-side surface of the fifth lens element is TD, an axial distance between the third lens element and the fourth lens element is T34, an axial distance between the second lens element and the third lens element is T23, a distance between a non-axial critical point of the image-side surface of the fifth lens element and the optical axis is Yp52, and they satisfy the following relations: $0.25<(SD52-SD42)/TD<0.60$; $0.1<T34/T23<2.8$; and $0.3<Yp52/SD52<0.95$.

When the relation of $0.25<(SD52-SD42)/TD<0.60$ is satisfied, the angle at which light projects onto the image sensor from the off-axis field can be effectively reduced so that the sensing efficiency of the image sensor can be improved and the off-axis aberration can be corrected for facilitating high image quality; preferably, the following relation is satisfied: $0.30<(SD52-SD42)/TD<0.45$.

When the relation of $0.1<T34/T23<2.8$ is satisfied, the arrangement of the third lens element is more suitable for the manufacturing of the lens system and keeping an appropriate total optical track length thereof.

When the relation of $0.3<Yp52/SD52<0.95$ is satisfied, the angle at which light projects onto the image sensor from the off-axis field can be effectively reduced so that the sensing efficiency of the image sensor can be improved, and thereby the aberration of on-axis and off-axis fields of the optical imaging lens system can be effectively corrected.

In the aforementioned optical imaging lens system, an Abbe number of the first lens element is V1, an Abbe number of the third lens element is V3, and they preferably satisfy the following relation: $25<V1-V3<45$. When the above relation is satisfied, the chromatic aberration of the optical imaging lens system can be favorably corrected.

In the aforementioned optical imaging lens system, a combined central thickness of all lens elements is ΣCT, the axial distance between the object-side surface of the first lens element and the image-side surface of the fifth lens element is TD, and they preferably satisfy the following relation: $0.65<\Sigma CT/TD<0.85$. When the above relation is satisfied, the thickness of each lens element in the optical imaging lens system is more appropriate for the assembly and spatial arrangement of the lens elements In the aforementioned optical imaging lens system, the optical imaging lens system further comprises an image plane; an axial distance between the object-side surface of the first lens element and the image plane is TTL, a maximum image height of the optical imaging lens system is ImgH, and they preferably satisfy the following relation: TTL/ImgH<1.6. When the above relation is satisfied, the optical imaging lens system can maintain a compact form so that it can be equipped in compact portable electronic products.

In the aforementioned optical imaging lens system, a curvature radius of the image-side surface of the fifth lens element is R10, a focal length of the optical imaging lens system is f, and they preferably satisfy the following relation: 0<R10/f<0.4. When the above relation is satisfied, suitable refractive power can be obtained by the configuration of the curvature radius of the image-side surface of the fifth lens element, and thereby the aberration of the optical imaging lens system can be favorably corrected.

In the aforementioned optical imaging lens system, a curvature radius of the image-side surface of the fourth lens element is R8, a focal length of the optical imaging lens system is f, and they preferably satisfy the following relation: −0.58<R8/f<0. When the above relation is satisfied, suitable refractive power can be obtained by the configuration of the curvature radius of the image-side surface of the fourth lens element, and thereby the aberration of the optical imaging lens system can be favorably corrected.

In the aforementioned optical imaging lens system, half of the maximal field of view of the optical imaging lens system is HFOV, and it preferably satisfies the following relation: 40 deg<HFOV<55 deg. When the above relation is satisfied, appropriate field of view can be provided for the optical imaging lens system In the aforementioned optical imaging lens system, an axial distance between the object-side surface of the first lens element and an image plane is TTL, and it preferably satisfies the following relation: 2.5 mm<TTL<4.7 mm. When the above relation is satisfied, aberrations of the optical imaging lens system can also be corrected while the total track length of the lens system is reduced; thus, the lens system can be compact while keeping a good image quality.

On the other hand, the present disclosure provides an optical imaging lens system comprising five non-cemented lens elements with refractive power, in order from an object side to an image side: a first lens element with positive refractive power having a convex object-side surface; a second lens element with positive refractive power; a third lens element with both the object-side and image-side surfaces thereof being aspheric; a fourth lens element with both the object-side and image-side surfaces thereof being aspheric; and a plastic fifth lens element having a concave image-side surface, with both the object-side and image-side surfaces thereof being aspheric, and having at least one inflection point positioned on at least one of the object-side and image-side surfaces thereof; wherein the optical imaging lens system further comprises an image plane; an axial distance between the object-side surface of the first lens element and the image plane is TTL, a maximum image height of the optical imaging lens system is ImgH, an axial distance between the third lens element and the fourth lens element is T34, an axial distance between the second lens element and the third lens element is T23, a distance between a non-axial critical point of the image-side surface of the fifth lens element and an optical axis is Yp52, a maximal effective radial distance on the image-side surface of the fifth lens element is SD52, and they satisfy the following relations: TTL/ImgH<1.6; 0.1<T34/T23<2.8; and 0.3<Yp52/SD52<0.95.

When the relation of TTL/ImgH<1.6 is satisfied, the optical imaging lens system can maintain a compact form so that it can be equipped in compact portable electronic products.

When the relation of 0.1<T34/T23<2.8 is satisfied, the arrangement of the third lens element is more suitable for the manufacturing of the lens system and keeping an appropriate total optical track length thereof.

When the relation of 0.3<Yp52/SD52<0.95 is satisfied, the angle at which light projects onto the image sensor from the off-axis field can be effectively reduced so that the sensing efficiency of the image sensor can be improved, and thereby the aberration of on-axis and off-axis fields of the optical imaging lens system can be effectively corrected.

In the aforementioned optical imaging lens system, a maximal effective radial distance on the image-side surface of the fifth lens element is SD52, a maximal effective radial distance on the image-side surface of the fourth lens element is SD42, an axial distance between the object-side surface of the first lens element and the image-side surface of the fifth lens element is TD, and they preferably satisfy the following relation: 0.30<(SD52−SD42)/TD<0.45. When the above relation is satisfied, the angle at which light projects onto the image sensor from the off-axis field can be effectively reduced so that the sensing efficiency of the image sensor can be improved and the off-axis aberration can be corrected for facilitating high image quality.

In the aforementioned optical imaging lens system, half of the maximal field of view of the optical imaging lens system is HFOV, and it preferably satisfies the following relation: 40 deg<HFOV<55 deg. When the above relation is satisfied, appropriate field of view can be provided for the optical imaging lens system On the other hand, the present disclosure provides an optical imaging lens system comprising five non-cemented lens elements with refractive power, in order from an object side to an image side: a first lens element with positive refractive power having a convex object-side surface; a second lens element with positive refractive power; a third lens element with both the object-side and image-side surfaces thereof being aspheric; a fourth lens element with both the object-side and image-side surfaces thereof being aspheric; and a plastic fifth lens element having a concave image-side surface, with both the object-side and image-side surfaces thereof being aspheric, and having at least one inflection point positioned on at least one of the object-side and image-side surfaces thereof; wherein half of the maximal field of view of the optical imaging lens system is HFOV, a curvature radius of the image-side surface of the fifth lens element is R10, a focal length of the optical imaging lens system is f, a distance between a non-axial critical point of the image-side surface of the fifth lens element and an optical axis is Yp52, a maximal effective radial distance on the image-side surface of the fifth lens element is SD52, and they satisfy the following relations: 40 deg<HFOV<55 deg; 0<R10/f<0.4; and 0.3<Yp52/SD52<0.95.

When the relation of 40 deg<HFOV<55 deg is satisfied, appropriate field of view can be provided for the optical imaging lens system.

When the relation of 0<R10/f<0.4 deg is satisfied, suitable refractive power can be obtained by the configuration of the curvature radius of the image-side surface of the fifth lens element, and thereby the aberration of the optical imaging lens system can be favorably corrected.

When the relation of 0.3<Yp52/SD52<0.95 is satisfied, the angle at which light projects onto the image sensor from the off-axis field can be effectively reduced so that the sensing efficiency of the image sensor can be improved, and thereby the aberration of on-axis and off-axis fields of the optical imaging lens system can be effectively corrected.

In the aforementioned optical imaging lens system a maximal effective radial distance on the image-side surface of the fifth lens element is SD52, a maximal effective radial distance on the image-side surface of the fourth lens element is SD42, an axial distance between the object-side surface of the first lens element and the image-side surface of the fifth lens element is TD, and they preferably satisfy the following relation: 0.25<(SD52−SD42)/TD<0.60. When the above relation is satisfied, the angle at which light projects onto the image sensor from the off-axis field can be effectively reduced so that the sensing efficiency of the image sensor can be improved and the off-axis aberration can be corrected for facilitating high image quality; preferably, the following relation is satisfied: 0.30<(SD52−SD42)/TD<0.45.

In the aforementioned optical imaging lens system, the lens elements can be made of glass or plastic material. If the lens elements are made of glass, the freedom for distributing the refractive power of the optical imaging lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the required number of the lens elements used in an optical system. Consequently, the total track length of the optical imaging lens system can be effectively reduced.

In the present optical imaging lens system, if a lens element has a convex surface, it means the portion of the surface in proximity to the optical axis is convex; if a lens element has a concave surface, it means the portion of the surface in proximity to the optical axis is concave.

In the present optical imaging lens system, there can be at least one stop, such as an aperture stop, a glare stop, or a field stop. Said glare stop or said field stop can be provided for eliminating stray light and thereby improving image resolution thereof. In addition, in the present optical imaging lens system, an aperture stop can be configured as a front stop (in front of the first lens element), a middle stop (between the first lens element and an image plane) or in front of the image plane. The allocation of the stop is determined by the preference of the optical designer.

Figure 12:
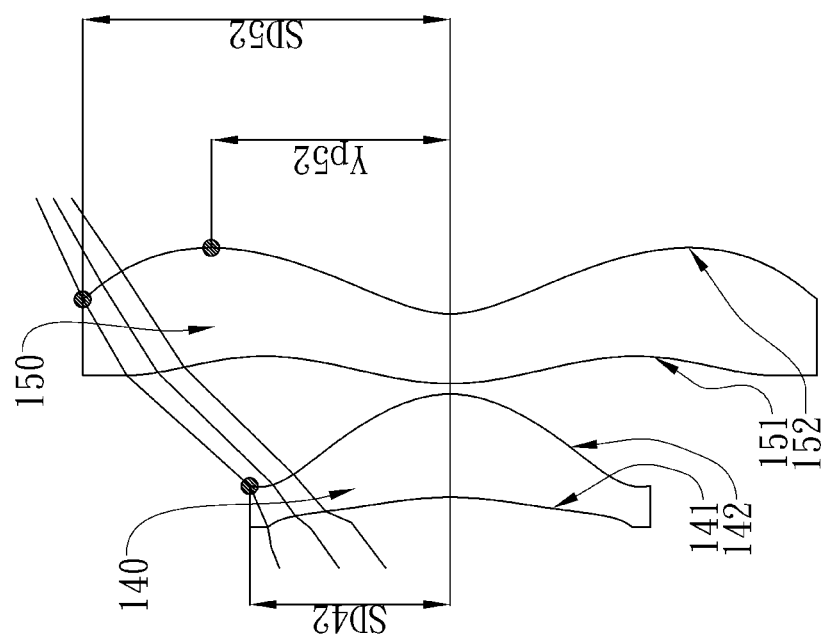
FIG. 12 shows the distance represented by the relation of SD42, SD52 and Yp52 in the present invention.

Please refer to FIG. 12, showing the first embodiment of the present invention, the first embodiment is described to clarify the distance represented by the relations of SD42, SD52 and Yp52 in the present invention. As shown in this figure, a maximal effective radial distance on the image-side surface 142 of the fourth lens element 140 is SD42, a maximal effective radial distance on the image-side surface 152 of the fifth lens element 150 is SD52, a distance between a non-axial critical point of the image-side surface of the fifth lens element and the optical axis is Yp52, wherein the critical point is a non-axial point on the image-side surface of the fifth lens element whose tangent is perpendicular to the optical axis.

Preferred embodiments of the present disclosure will be described in the following paragraphs by referring to the accompanying drawings.

Embodiment 1

Figure 1B:
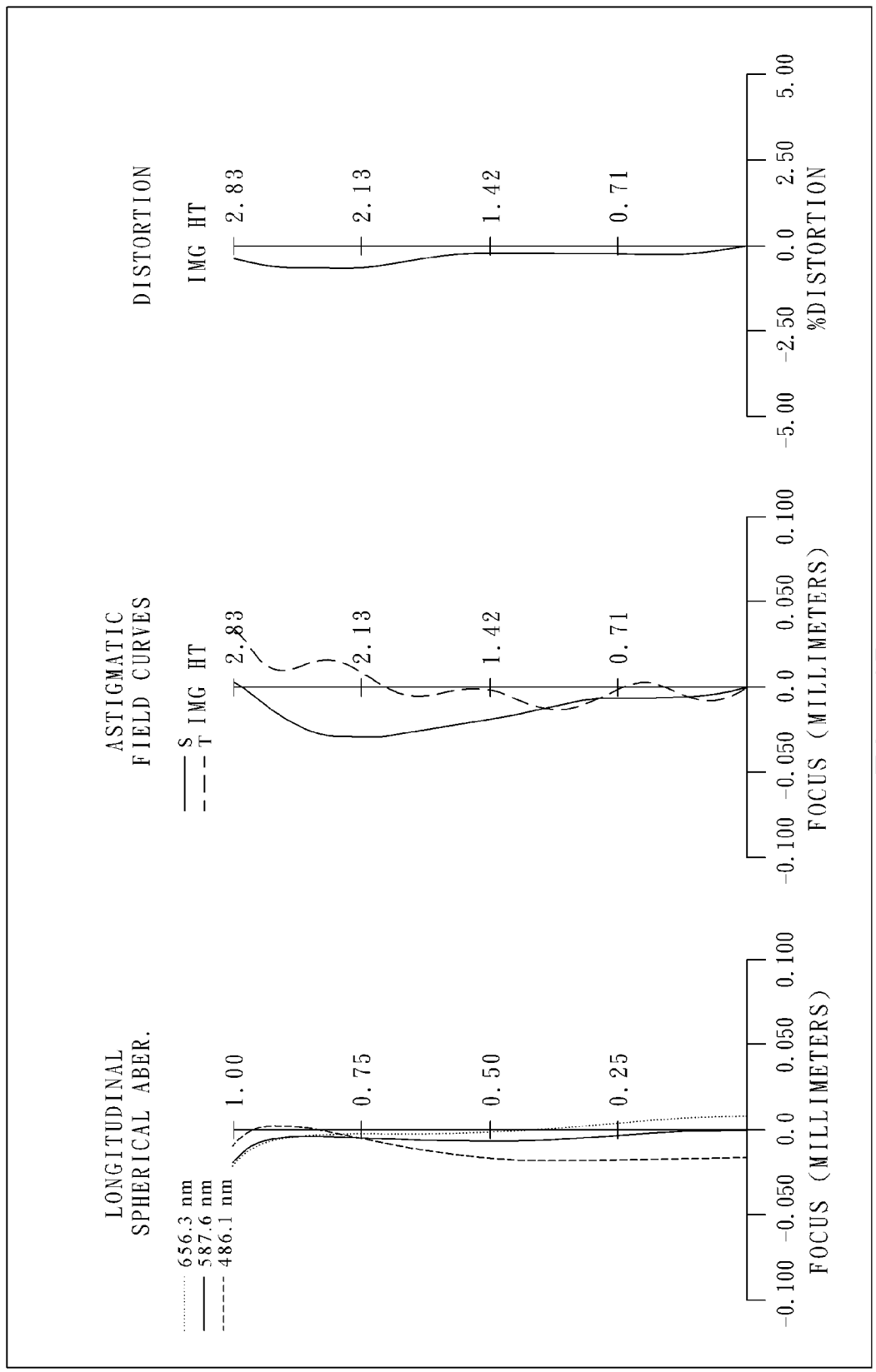
FIG. 1B shows the aberration curves of the first embodiment of the present disclosure.

FIG. 1A shows an optical imaging lens system in accordance with the first embodiment of the present disclosure, and FIG. 1B shows the aberration curves of the first embodiment of the present disclosure. The optical imaging lens system of the first embodiment of the present disclosure comprises five lens elements, in order from an object side to an image side:

a first lens element 110 made of plastic with positive refractive power having a convex object-side surface 111 and a convex image-side surface 112, the object-side and image-side surfaces 111 and 112 thereof being aspheric;

a second lens element 120 made of plastic with positive refractive power having a concave object-side surface 121 and a convex image-side surface 122, the object-side and image-side surfaces 121 and 122 thereof being aspheric;

a third lens element 130 made of plastic with negative refractive power having a concave object-side surface 131 and a convex image-side surface 132, the object-side and image-side surfaces 131 and 132 thereof being aspheric;

a fourth lens element 140 made of plastic with positive refractive power having a concave object-side surface 141 and a convex image-side surface 142, the object-side and image-side surfaces 141 and 142 thereof being aspheric; and a fifth lens element 150 made of plastic with negative refractive power having a convex object-side surface 151 and a concave image-side surface 152, the object-side and image-side surfaces 151 and 152 thereof being aspheric, and at least one inflection point is formed on both the object-side surface 151 and the image-side surface 152 thereof;

wherein an aperture stop 100 is disposed between an imaged object and the first lens element 110;

the optical imaging lens system further comprises an IR filter 160 disposed between the image-side surface 152 of the fifth lens element 150 and an image plane 180, and the IR filter 160 is made of glass and has no influence on the focal length of the optical imaging lens system; the optical imaging lens system further comprises an image sensor 170 provided on the image plane 180.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)
f = 2.85 mm, Fno = 2.45, HFOV = 45.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.024 | | | | |
| 2 | Lens 1 | 2.200 | ASP | 0.550 | Plastic | 1.544 | 55.9 | 3.36 |
| 3 | | −9.882 | ASP | 0.129 | | | | |
| 4 | Lens 2 | −5.900 | ASP | 0.240 | Plastic | 1.640 | 23.3 | 36.78 |
| 5 | | −4.792 | ASP | 0.230 | | | | |

TABLE 1-continued (Embodiment 1)
f = 2.85 mm, Fno = 2.45, HFOV = 45.0 deg.

| Surface # | | Curvature Radius | | Thickness | Material | Index | Abbe # | Focal length |
|---|---|---|---|---|---|---|---|---|
| 6 | Lens 3 | −2.361 | ASP | 0.250 | Plastic | 1.640 | 23.3 | −3.78 |
| 7 | | −100.000 | ASP | 0.140 | | | | |
| 8 | Lens 4 | −1.956 | ASP | 0.625 | Plastic | 1.544 | 55.9 | 1.60 |
| 9 | | −0.670 | ASP | 0.064 | | | | |
| 10 | Lens 5 | 1.465 | ASP | 0.423 | Plastic | 1.544 | 55.9 | −2.35 |
| 11 | | 0.613 | ASP | 0.700 | | | | |
| 12 | IR-filter | Plano | | 0.300 | Glass | 1.517 | 64.2 | — |
| 13 | | Plano | | 0.584 | | | | |
| 14 | Image | Plano | | — | | | | |

* Reference wavelength is d-line 587.6 nm

TABLE 2

| Aspheric Coefficients | | | | | |
|---|---|---|---|---|---|
| Surface # | 2 | 3 | 4 | 5 | 6 |
| k = | −1.9694E+01 | −1.0000E+00 | −1.0000E+00 | −1.0000E+00 | −1.5997E+01 |
| A4 = | 1.8353E−01 | −2.4292E−01 | −1.9010E−01 | −5.1840E−03 | −3.3650E−01 |
| A6 = | −5.2470E−01 | −5.3665E−01 | −7.3047E−01 | −4.9576E−01 | −3.1143E−01 |
| A8 = | 7.3535E−01 | 4.4554E−01 | 6.9551E−02 | 1.6392E−01 | 7.0364E−01 |
| A10 = | −7.2910E−01 | −8.4312E−01 | −3.1647E−01 | 2.9048E−01 | −3.3789E−01 |
| A12 = | −7.6097E−01 | 6.4492E−01 | 1.4966E+00 | −1.9659E−01 | 6.3316E−02 |
| A14 = | −7.8940E−02 | 1.4822E−01 | −3.0125E−01 | 2.0449E−02 | |

| Surface # | 7 | 8 | 9 | 10 | 11 |
|---|---|---|---|---|---|
| k = | −5.0000E+01 | 1.9123E+00 | −2.9559E+00 | −7.4726E+00 | −4.3674E+00 |
| A4 = | −7.3805E−02 | 2.8059E−01 | −2.3256E−01 | −6.2968E−02 | −8.1288E−02 |
| A6 = | −5.5897E−02 | 3.0451E−02 | 2.0238E−01 | −1.1280E−02 | 2.4765E−02 |
| A8 = | 1.0189E−01 | −2.8081E−01 | −1.1726E−01 | 8.7210E−03 | −8.1730E−03 |
| A10 = | −1.0439E−01 | 2.8123E−01 | 9.2478E−02 | −9.1544E−04 | 2.0190E−03 |
| A12 = | 2.8358E−02 | −1.1800E−01 | 3.9798E−03 | −8.1100E−05 | −3.0828E−04 |
| A14 = | | 2.1654E−02 | −1.5792E−02 | 1.3513E−05 | 2.0207E−05 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the distance between a point on the aspheric surface at a distance Y from the optical axis and the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present optical imaging lens system, the focal length of the optical imaging lens system is f, and it satisfies the following relation: f=2.85 (mm).

In the first embodiment of the present optical imaging lens system, the f-number of the optical imaging lens system is Fno, and it satisfies the relation: Fno=2.45.

In the first embodiment of the present optical imaging lens system, half of the maximal field of view of the optical imaging lens system is HFOV, and it satisfies the relation: HFOV=45.0 deg.

In the first embodiment of the present optical imaging lens system, an Abbe number of the first lens element 110 is V1, an Abbe number of the third lens element 130 is V3, and they satisfy the relation: V1−V3=32.6.

In the first embodiment of the present optical imaging lens system, an axial distance between the third lens element 130 and the fourth lens element 140 is T34, an axial distance between the second lens element 120 and the third lens element 130 is T23, and they satisfy the relation: T34/T23=0.61.

In the first embodiment of the present optical imaging lens system, a combined central thickness of all lens elements is ΣCT, the axial distance between the object-side surface 111 of the first lens element 110 and the image-side surface 152 of the fifth lens element 150 is TD, and they satisfy the relation: ΣCT/TD=0.79.

In the first embodiment of the present optical imaging lens system, a curvature radius of the image-side surface 142 of the fourth lens element 140 is R8, a focal length of the optical imaging lens system is f, and they satisfy the relation: R8/f=−0.24.

In the first embodiment of the present optical imaging lens system, a curvature radius of the image-side surface 152 of the fifth lens element 150 is R10, a focal length of the optical imaging lens system is f, and they satisfy the relation: R10/f=0.21.

In the first embodiment of the present optical imaging lens system, a maximal effective radial distance on the image-side surface 152 of the fifth lens element 150 is SD52, a maximal effective radial distance on the image-side surface 142 of the fourth lens element 140 is SD42, the axial distance between the object-side surface 111 of the first lens element 110 and the image-side surface 152 of the fifth lens element 150 is TD, and they satisfy the relation: (SD52−SD42)/TD=0.38.

In the first embodiment of the present optical imaging lens system, a distance between a non-axial critical point of the image-side surface 152 of the fifth lens element 150 and the optical axis is Yp52, a maximal effective radial distance on the image-side surface 152 of the fifth lens element 150 is SD52, and they satisfy the relation: Yp52/SD52=0.65.

In the first embodiment of the present optical imaging lens system, an axial distance between the object-side surface 111 of the first lens element 110 and the image plane 180 is TTL, and it satisfies the relation: TTL=4.13.

In the first embodiment of the present optical imaging lens system, an axial distance between the object-side surface 111 of the first lens element 110 and the image plane 180 is TTL, a maximum image height of the optical imaging lens system, which here is a half of a diagonal length of an effective photosensitive area of the image sensor 170, is ImgH, and they satisfy the relation: TTL/ImgH=1.46.

Embodiment 2

Figure 2A:
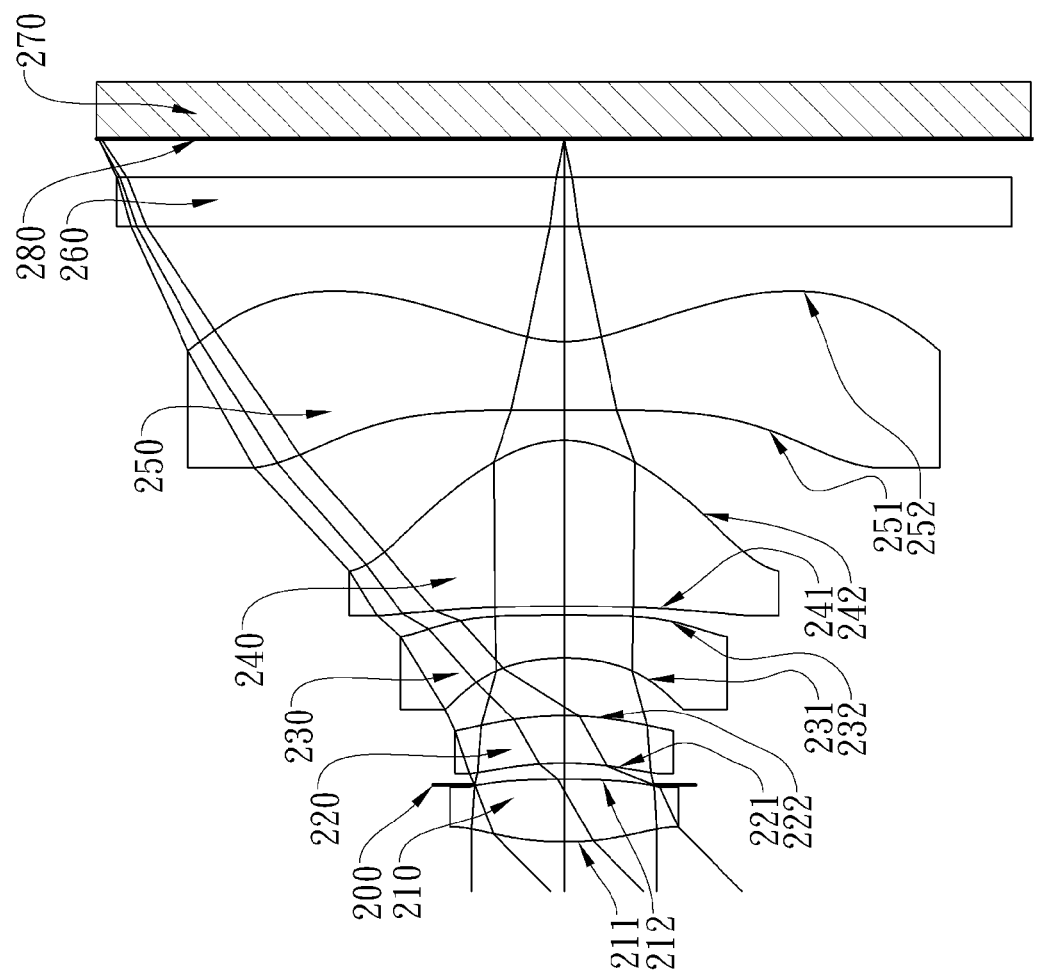
FIG. 2A shows an optical imaging lens system in accordance with the second embodiment of the present disclosure.
Figure 2B:
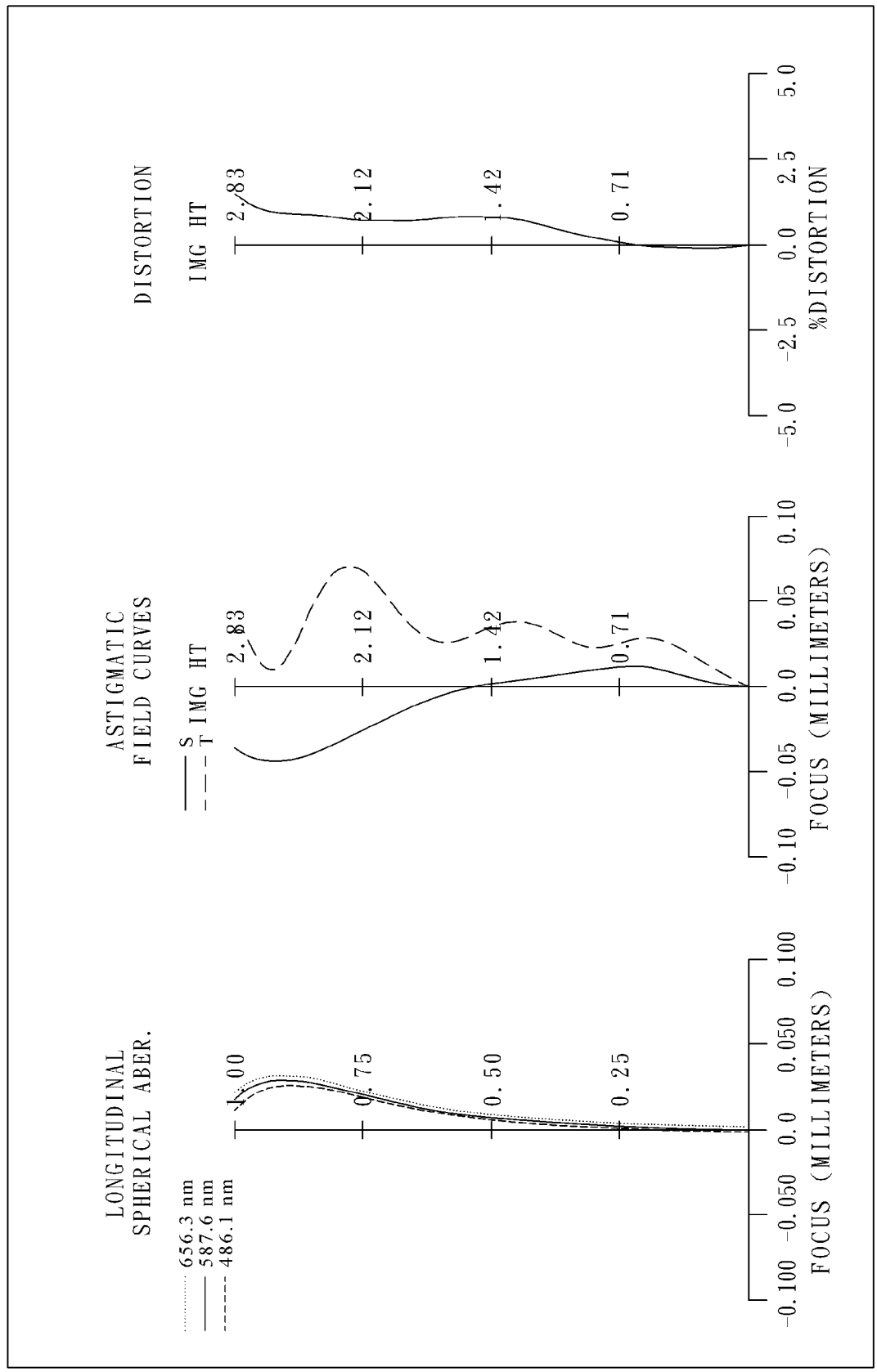
FIG. 2B shows the aberration curves of the second embodiment of the present disclosure.

FIG. 2A shows an optical imaging lens system in accordance with the second embodiment of the present disclosure, and FIG. 2B shows the aberration curves of the second embodiment of the present disclosure. The optical imaging lens system of the second embodiment of the present disclosure comprises five lens elements, in order from an object side to an image side:

a first lens element 210 made of plastic with positive refractive power having a convex object-side surface 211 and a convex image-side surface 212, the object-side and image-side surfaces 211 and 212 thereof being aspheric;

a second lens element 220 made of plastic with positive refractive power having a concave object-side surface 221 and a convex image-side surface 222, the object-side and image-side surfaces 221 and 222 thereof being aspheric;

a third lens element 230 made of plastic with negative refractive power having a concave object-side surface 231 and a convex image-side surface 232, the object-side and image-side surfaces 231 and 232 thereof being aspheric;

a fourth lens element 240 made of plastic with positive refractive power having a concave object-side surface 241 and a convex image-side surface 242, the object-side and image-side surfaces 241 and 242 thereof being aspheric; and a fifth lens element 250 made of plastic with negative refractive power having a concave object-side surface 251 and a concave image-side surface 252, the object-side and image-side surfaces 251 and 252 thereof being aspheric, and at least one inflection point is formed on both the object-side surface 251 and the image-side surface 252 thereof;

wherein an aperture stop 200 is disposed between the first lens element 210 and the second lens element 220;

the optical imaging lens system further comprises an IR filter 260 disposed between the image-side surface 252 of the fifth lens element 250 and an image plane 280, and the IR filter 260 is made of glass and has no influence on the focal length of the optical imaging lens system; the optical imaging lens system further comprises an image sensor 270 provided on the image plane 280.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 2.80 mm, Fno = 2.48, HFOV = 44.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.742 | ASP | 0.384 | Plastic | 1.544 | 55.9 | 2.53 |
| 2 | | −6.000 | ASP | −0.034 | | | | |
| 3 | Ape. Stop | Plano | | 0.131 | | | | |
| 4 | Lens 2 | −2.015 | ASP | 0.289 | Plastic | 1.640 | 23.3 | 34.77 |
| 5 | | −1.951 | ASP | 0.351 | | | | |
| 6 | Lens 3 | −1.352 | ASP | 0.260 | Plastic | 1.640 | 23.3 | −2.14 |
| 7 | | −100.000 | ASP | 0.056 | | | | |
| 8 | Lens 4 | −15.658 | ASP | 1.012 | Plastic | 1.544 | 55.9 | 1.17 |
| 9 | | −0.624 | ASP | 0.183 | | | | |
| 10 | Lens 5 | −100.000 | ASP | 0.419 | Plastic | 1.530 | 55.8 | −1.43 |
| 11 | | 0.767 | ASP | 0.700 | | | | |
| 12 | IR-filter | Plano | | 0.300 | Glass | 1.517 | 64.2 | — |
| 13 | | Plano | | 0.237 | | | | |
| 14 | Image | Plano | | — | | | | |

* Reference wavelength is d-line 587.6 nm

TABLE 4

Aspheric Coefficients

| Surface # | 1 | 2 | 4 | 5 | 6 |
|---|---|---|---|---|---|
| k = | −1.1177E+01 | −4.7810E+01 | −1.3505E+01 | −3.6274E+00 | −2.0912E+00 |
| A4 = | 1.7638E−01 | −9.2084E−02 | 1.9458E−02 | 7.5413E−02 | −4.1035E−01 |
| A6 = | −3.4076E−01 | −3.5462E−01 | −1.6468E−01 | −1.7745E−01 | −6.3283E−01 |
| A8 = | −1.4516E−01 | 8.6057E−02 | 6.1606E−01 | −4.6645E−01 | 4.0667E−01 |
| A10 = | −3.4946E−01 | 1.7139E−01 | −4.5623E−01 | 9.2963E−01 | 9.5642E−01 |
| A12 = | −1.4404E−01 | −3.6360E−01 | 1.3753E+00 | 3.9895E−01 | 2.9805E−01 |
| A14 = | 8.3173E−02 | 1.5300E−01 | −6.9235E−01 | −5.6945E−02 | |

TABLE 4-continued

Aspheric Coefficients

| Surface # | 7 | 8 | 9 | 10 | 11 |
|---|---|---|---|---|---|
| k = | −5.0000E+01 | 1.0000E+01 | −2.9275E+00 | −5.0000E+01 | −6.5971E+00 |
| A4 = | −1.7344E−01 | −4.2851E−02 | −2.8056E−01 | −3.1302E−02 | −5.8489E−02 |
| A6 = | −1.1176E−01 | 1.0352E−01 | 2.1684E−01 | −2.6367E−01 | 1.4345E−02 |
| A8 = | 1.7497E−01 | −2.3598E−01 | −1.2581E−01 | 1.2215E−02 | −5.3865E−03 |
| A10 = | −1.4077E−02 | 2.9169E−01 | 7.5346E−02 | −9.1331E−04 | 1.5578E−03 |
| A12 = | −7.9616E−04 | −1.6633E−01 | −1.5375E−02 | −1.5748E−04 | −2.5328E−04 |
| A14 = | | 3.5321E−02 | −7.1942E−04 | 1.8641E−05 | 1.6549E−05 |

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 5.

TABLE 5

(Embodiment 2)

| f | 2.80 | R8/f | −0.22 |
|---|---|---|---|
| Fno | 2.48 | R10/f | 0.27 |
| HFOV [deg.] | 44.9 | (SD52 − SD42)/TD | 0.32 |
| V1 − V3 | 32.6 | Yp52/SD52 | 0.61 |
| T34/T23 | 0.16 | TTL [mm] | 4.19 |
| ΣCT/TD | 0.77 | TTL/ImgH | 1.48 |

Embodiment 3

Figure 3A:
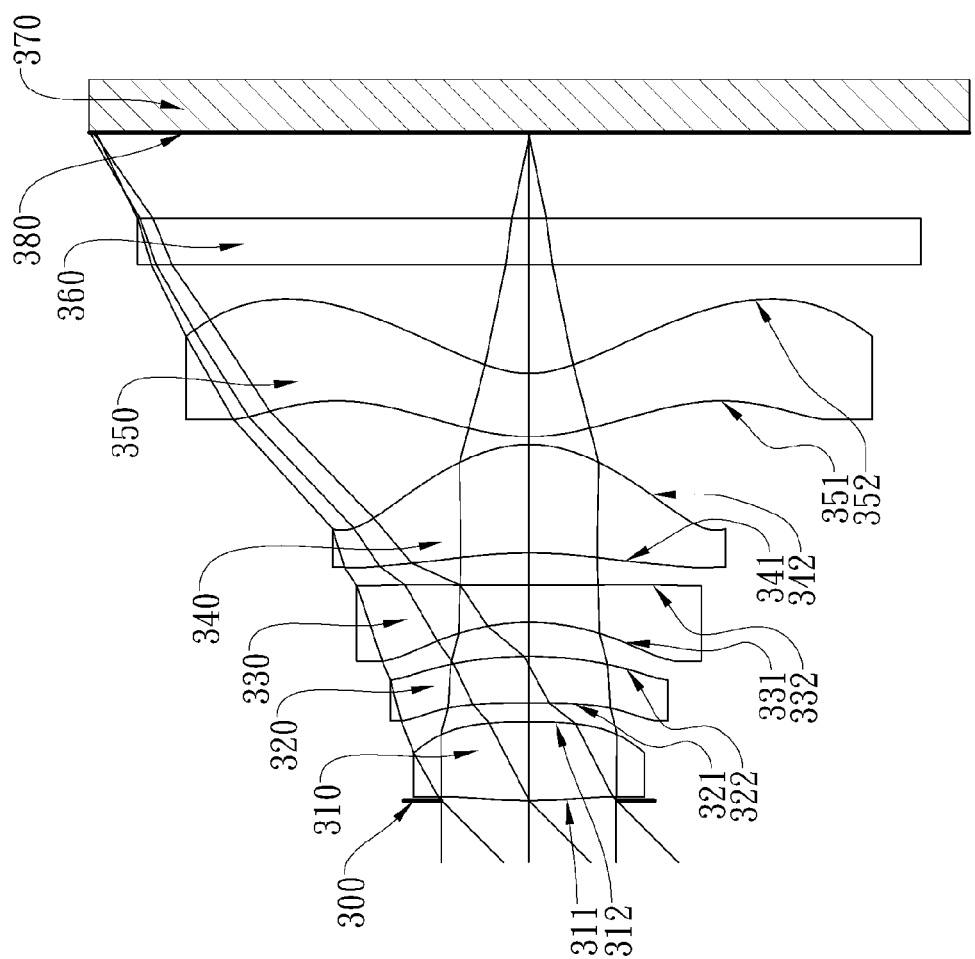
FIG. 3A shows an optical imaging lens system in accordance with the third embodiment of the present disclosure.
Figure 3B:
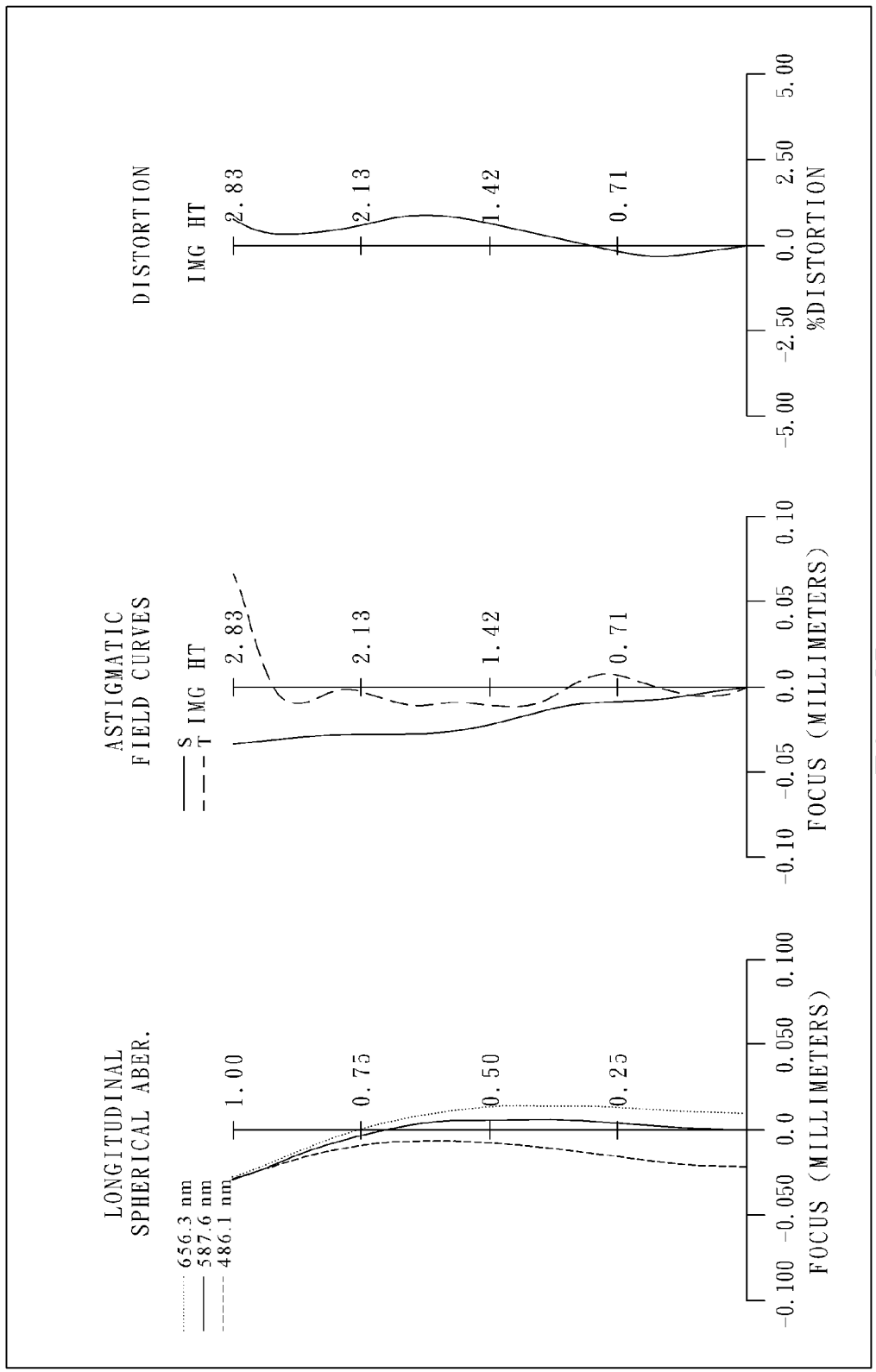
FIG. 3B shows the aberration curves of the third embodiment of the present disclosure.

FIG. 3A shows an optical imaging lens system in accordance with the third embodiment of the present disclosure, and FIG. 3B shows the aberration curves of the third embodiment of the present disclosure. The optical imaging lens system of the third embodiment of the present disclosure comprises five lens elements, in order from an object side to an image side:

a first lens element 310 made of plastic with positive refractive power having a convex object-side surface 311 and a convex image-side surface 312, the object-side and image-side surfaces 311 and 312 thereof being aspheric;

a second lens element 320 made of plastic with positive refractive power having a concave object-side surface 321 and a convex image-side surface 322, the object-side and image-side surfaces 321 and 322 thereof being aspheric;

a third lens element 330 made of plastic with negative refractive power having a concave object-side surface 331 and a convex image-side surface 332, the object-side and image-side surfaces 331 and 332 thereof being aspheric;

a fourth lens element 340 made of plastic with positive refractive power having a concave object-side surface 341 and a convex image-side surface 342, the object-side and image-side surfaces 341 and 342 thereof being aspheric; and a fifth lens element 350 made of plastic with negative refractive power having a convex object-side surface 351 and a concave image-side surface 352, the object-side and image-side surfaces 351 and 352 thereof being aspheric, and at least one inflection point is formed on both the object-side surface 351 and the image-side surface 352 thereof;

wherein an aperture stop 300 is disposed between an imaged object and the first lens element 310;

the optical imaging lens system further comprises an IR filter 360 disposed between the image-side surface 352 of the fifth lens element 350 and an image plane 380, and the IR filter 360 is made of glass and has no influence on the focal length of the optical imaging lens system; the optical imaging lens system further comprises an image sensor 370 provided on the image plane 380.

The detailed optical data of the third embodiment is shown in TABLE 6, and the aspheric surface data is shown in TABLE 7, wherein the units of the curvature radius, the thickness and the focal length are expressed in mm, and HFOV is half of the maximal field of view.

TABLE 6

(Embodiment 3)
f = 2.82 mm, Fno = 2.50, HFOV = 45.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | 0.000 | | | | |
| 2 | Lens 1 | 3.631 | ASP | 0.509 | Plastic | 1.544 | 55.9 | 3.82 |
| 3 | | −4.615 | ASP | 0.120 | | | | |
| 4 | Lens 2 | −18.339 | ASP | 0.302 | Plastic | 1.640 | 23.3 | 4.45 |
| 5 | | −2.479 | ASP | 0.220 | | | | |
| 6 | Lens 3 | −1.397 | ASP | 0.240 | Plastic | 1.640 | 23.3 | −2.22 |
| 7 | | −100.000 | ASP | 0.208 | | | | |
| 8 | Lens 4 | −2.911 | ASP | 0.702 | Plastic | 1.544 | 55.9 | 1.83 |
| 9 | | −0.806 | ASP | 0.050 | | | | |
| 10 | Lens 5 | 1.212 | ASP | 0.408 | Plastic | 1.544 | 55.9 | −3.16 |
| 11 | | 0.626 | ASP | 0.700 | | | | |
| 12 | IR-filter | Plano | | 0.300 | Glass | 1.517 | 64.2 | — |
| 13 | | Plano | | 0.556 | | | | |
| 14 | Image | Plano | | — | | | | |

* Reference wavelength is d-line 587.6 nm

TABLE 7

Aspheric Coefficients

| Surface # | 2 | 3 | 4 | 5 | 6 |
|---|---|---|---|---|---|
| k = | −6.8855E+01 | −1.0000E+00 | −1.0000E+00 | −1.0000E+00 | −6.1935E+00 |
| A4 = | 3.5746E−02 | −4.4349E−01 | −2.7765E−01 | 6.4363E−02 | −1.0788E−01 |
| A6 = | −5.2008E−01 | −1.7574E−01 | −3.7453E−01 | −3.6026E−01 | −8.8178E−02 |
| A8 = | 4.6115E−01 | 3.5566E−01 | 9.4151E−01 | 5.6363E−01 | −1.9125E−02 |
| A10 = | −8.1659E−01 | −6.6366E−02 | −7.9957E−01 | −4.5111E−01 | 5.7445E−01 |
| A12 = | 3.3207E−02 | −2.9391E−01 | 8.7874E−01 | 2.4922E−01 | −3.7935E−01 |
| A14 = | −7.8812E−02 | 1.4814E−01 | −3.2538E−01 | 1.9297E−02 | |

| Surface # | 7 | 8 | 9 | 10 | 11 |
|---|---|---|---|---|---|
| k = | −5.0000E+01 | 2.0305E+00 | −2.7436E+00 | −7.4962E+00 | −3.8341E+00 |
| A4 = | 7.4573E−02 | 1.1264E−01 | −1.5693E−01 | −2.0330E−02 | −6.3076E−02 |
| A6 = | −1.4969E−01 | 9.5305E−02 | 1.8180E−01 | −2.6381E−01 | 1.8757E−02 |
| A8 = | 1.0365E−01 | −2.6375E−01 | −1.4905E−01 | 7.7001E−03 | −7.6409E−03 |
| A10 = | −3.7581E−02 | 2.6322E−01 | 7.8403E−02 | −1.2519E−04 | 2.0533E−03 |
| A12 = | 1.0255E−02 | −1.3775E−01 | 5.7029E−03 | −1.1606E−04 | −3.0692E−04 |
| A14 = | | 3.2268E−02 | −8.5395E−03 | 7.6299E−06 | 1.9031E−05 |

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 8.

TABLE 8

(Embodiment 3)

| f | 2.82 | R8/f | −0.29 |
|---|---|---|---|
| Fno | 2.50 | R10/f | 0.22 |
| HFOV [deg.] | 45.0 | (SD52 − SD42)/TD | 0.34 |
| V1 − V3 | 32.6 | Yp52/SD52 | 0.71 |
| T34/T23 | 0.95 | TTL [mm] | 4.21 |
| ΣCT/TD | 0.78 | TTL/ImgH | 1.49 |

Embodiment 4

Figure 4A:
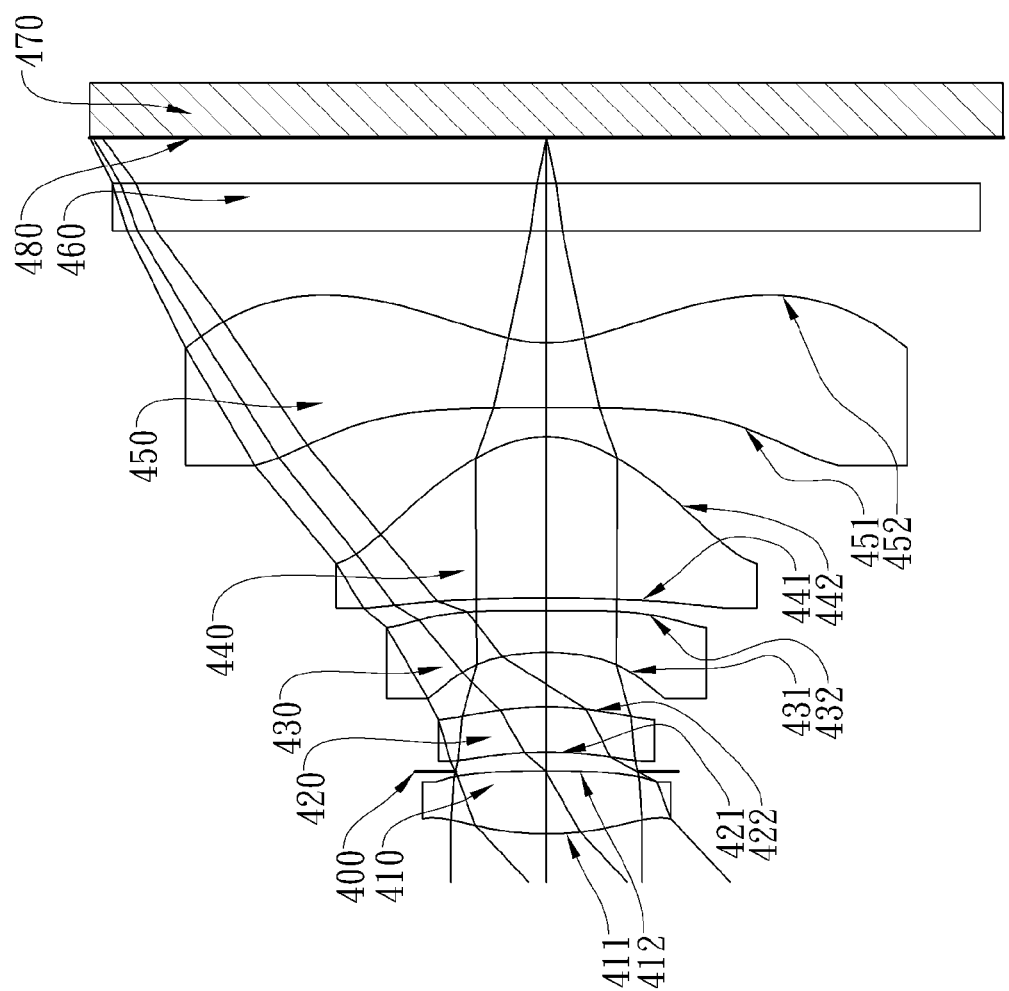
FIG. 4A shows an optical imaging lens system in accordance with the fourth embodiment of the present disclosure.
Figure 4B:
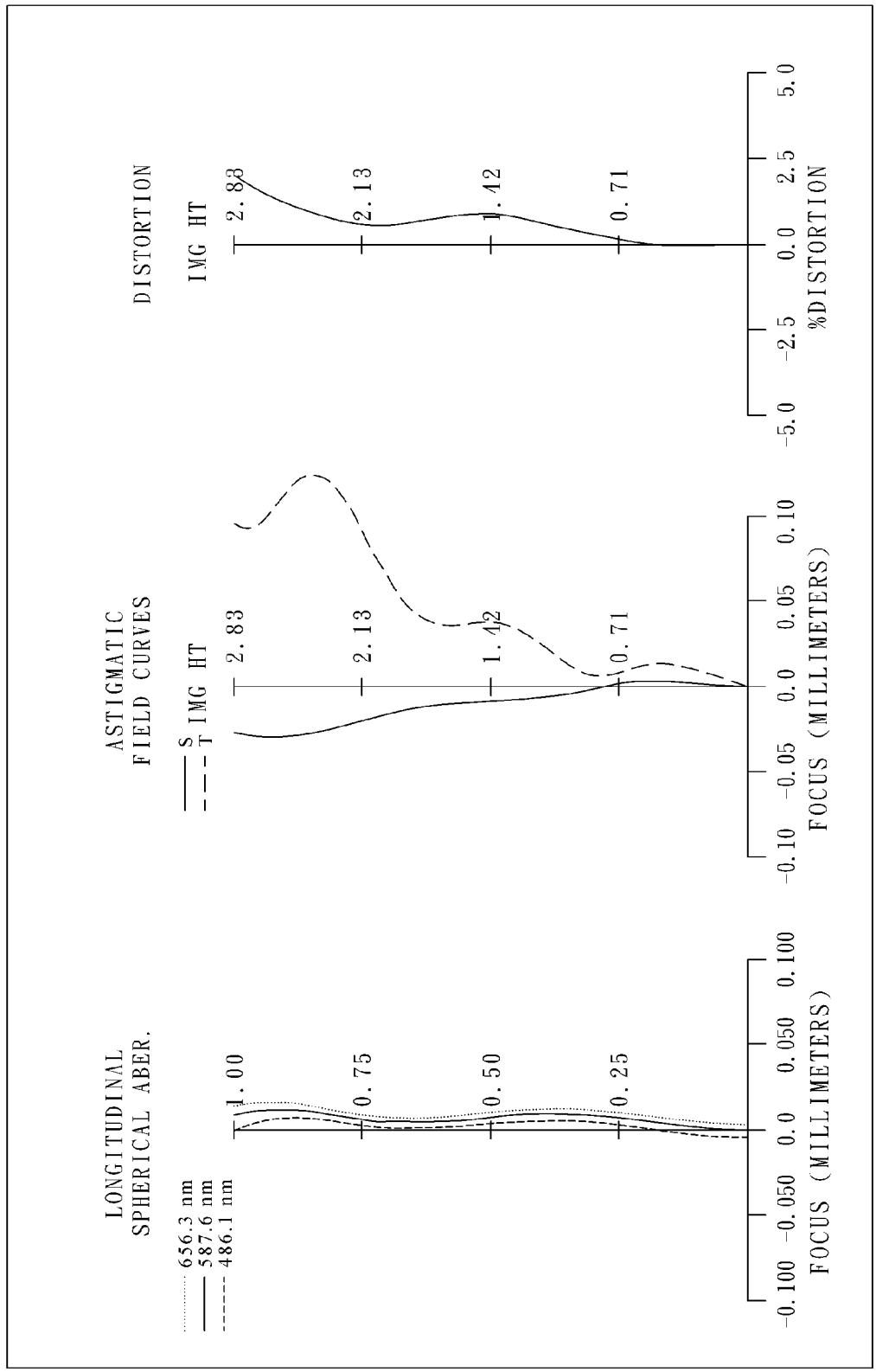
FIG. 4B shows the aberration curves of the fourth embodiment of the present disclosure.

FIG. 4A shows an optical imaging lens system in accordance with the fourth embodiment of the present disclosure, and FIG. 4B shows the aberration curves of the fourth embodiment of the present disclosure. The optical imaging lens system of the fourth embodiment of the present disclosure comprises five lens elements, in order from an object side to an image side:

a first lens element 410 made of plastic with positive refractive power having a convex object-side surface 411 and a convex image-side surface 412, the object-side and image-side surfaces 411 and 412 thereof being aspheric;

a second lens element 420 made of plastic with positive refractive power having a concave object-side surface 421 and a convex image-side surface 422, the object-side and image-side surfaces 421 and 422 thereof being aspheric;

a third lens element 430 made of plastic with negative refractive power having a concave object-side surface 431 and a concave image-side surface 432, the object-side and image-side surfaces 431 and 432 thereof being aspheric;

a fourth lens element 440 made of plastic with positive refractive power having a concave object-side surface 441 and a convex image-side surface 442, the object-side and image-side surfaces 441 and 442 thereof being aspheric; and a fifth lens element 450 made of plastic with negative refractive power having a concave object-side surface 451 and a concave image-side surface 452, the object-side and image-side surfaces 451 and 452 thereof being aspheric, and at least one inflection point is formed on both the object-side surface 451 and the image-side surface 452 thereof;

wherein an aperture stop 400 is disposed between the first lens element 410 and the second lens element 420;

the optical imaging lens system further comprises an IR filter 460 disposed between the image-side surface 452 of the fifth lens element 450 and an image plane 480, and the IR filter 460 is made of glass and has no influence on the focal length of the optical imaging lens system; the optical imaging lens system further comprises an image sensor 470 provided on the image plane 480.

The detailed optical data of the fourth embodiment is shown in TABLE 9, and the aspheric surface data is shown in TABLE 10, wherein the units of the curvature radius, the thickness and the focal length are expressed in mm, and HFOV is half of the maximal field of view.

TABLE 9

(Embodiment 4)
f = 2.95 mm, Fno = 2.48, HFOV = 43.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.720 | ASP | 0.395 | Plastic | 1.544 | 55.9 | 2.70 |
| 2 | | −9.384 | ASP | −0.005 | | | | |
| 3 | Ape. Stop | Plano | | 0.123 | | | | |
| 4 | Lens 2 | −2.275 | ASP | 0.283 | Plastic | 1.640 | 23.3 | 19.81 |
| 5 | | −2.022 | ASP | 0.341 | | | | |
| 6 | Lens 3 | −1.499 | ASP | 0.260 | Plastic | 1.640 | 23.3 | −2.25 |
| 7 | | 37.968 | ASP | 0.078 | | | | |

TABLE 9-continued (Embodiment 4)
f = 2.95 mm, Fno = 2.48, HFOV = 43.3 deg.

| Surface # | | Curvature Radius | Thickness | Material | Index | Abbe # | Focal length |
|---|---|---|---|---|---|---|---|
| 8 | Lens 4 | −13.837 ASP | 1.012 | Plastic | 1.544 | 55.9 | 1.21 |
| 9 | | −0.644 ASP | 0.181 | | | | |
| 10 | Lens 5 | −30.307 ASP | 0.405 | Plastic | 1.530 | 55.8 | −1.47 |
| 11 | | 0.803 ASP | 0.700 | | | | |
| 12 | IR-filter | Plano | 0.300 | Glass | 1.517 | 64.2 | — |
| 13 | | Plano | 0.285 | | | | |
| 14 | Image | Plano | — | | | | |

* Reference wavelength is d-line 587.6 nm

TABLE 10

Aspheric Coefficients

| Surface # | 1 | 2 | 4 | 5 | 6 |
|---|---|---|---|---|---|
| k = | −1.1835E+01 | −3.5721E+01 | −1.0803E+01 | −3.2337E+00 | −2.3902E+00 |
| A4 = | 1.8411E−01 | −1.1054E−01 | 3.9606E−02 | 7.0923E−02 | −3.6849E−01 |
| A6 = | −2.3323E−01 | −3.8636E−01 | −2.9265E−01 | 8.1319E−03 | −5.6447E−01 |
| A8 = | −6.0666E−01 | 6.6428E−01 | 1.6517E+00 | −1.8491E−01 | 4.9326E−01 |
| A10 = | 5.2851E−01 | −3.4499E−01 | −1.7164E+00 | 8.8612E−01 | 6.4244E−01 |
| A12 = | −2.9374E−01 | −1.0304E+00 | 1.2420E+00 | 3.6308E−01 | 3.3098E−01 |
| A14 = | 1.8550E−01 | 1.4215E+00 | −7.4013E−01 | −4.6920E−01 | |

| Surface # | 7 | 8 | 9 | 10 | 11 |
|---|---|---|---|---|---|
| k = | 1.0000E+00 | −5.0000E+01 | −3.0017E+00 | −1.1021E+00 | −6.6324E+00 |
| A4 = | −1.5114E−01 | −2.2401E−02 | −2.6624E−01 | −2.4816E−02 | −5.7947E−02 |
| A6 = | −1.1678E−01 | 8.1115E−02 | 2.2310E−01 | −2.7843E−02 | 1.4158E−02 |
| A8 = | 1.6374E−01 | −2.4457E−01 | −1.3868E−01 | 1.1930E−02 | −5.4630E−03 |
| A10 = | −2.4468E−02 | 2.9785E−01 | 7.3858E−02 | −8.2825E−04 | 1.5510E−03 |
| A12 = | 1.1698E−02 | −1.6012E−01 | −1.4052E−02 | −1.5504E−04 | −2.3963E−04 |
| A14 = | | 3.3058E−02 | −3.8509E−04 | 1.7515E−05 | 1.4898E−05 |

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 11.

TABLE 11

(Embodiment 4)

| f | 2.95 | R8/f | −0.22 |
|---|---|---|---|
| Fno | 2.48 | R10/f | 0.27 |
| HFOV [deg.] | 43.3 | (SD52-SD42)/TD | 0.31 |
| V1-V3 | 32.6 | Yp52/SD52 | 0.61 |
| T34/T23 | 0.23 | TTL [mm] | 4.26 |
| ΣCT/TD | 0.77 | TTL/ImgH | 1.50 |

Embodiment 5

Figure 5A:
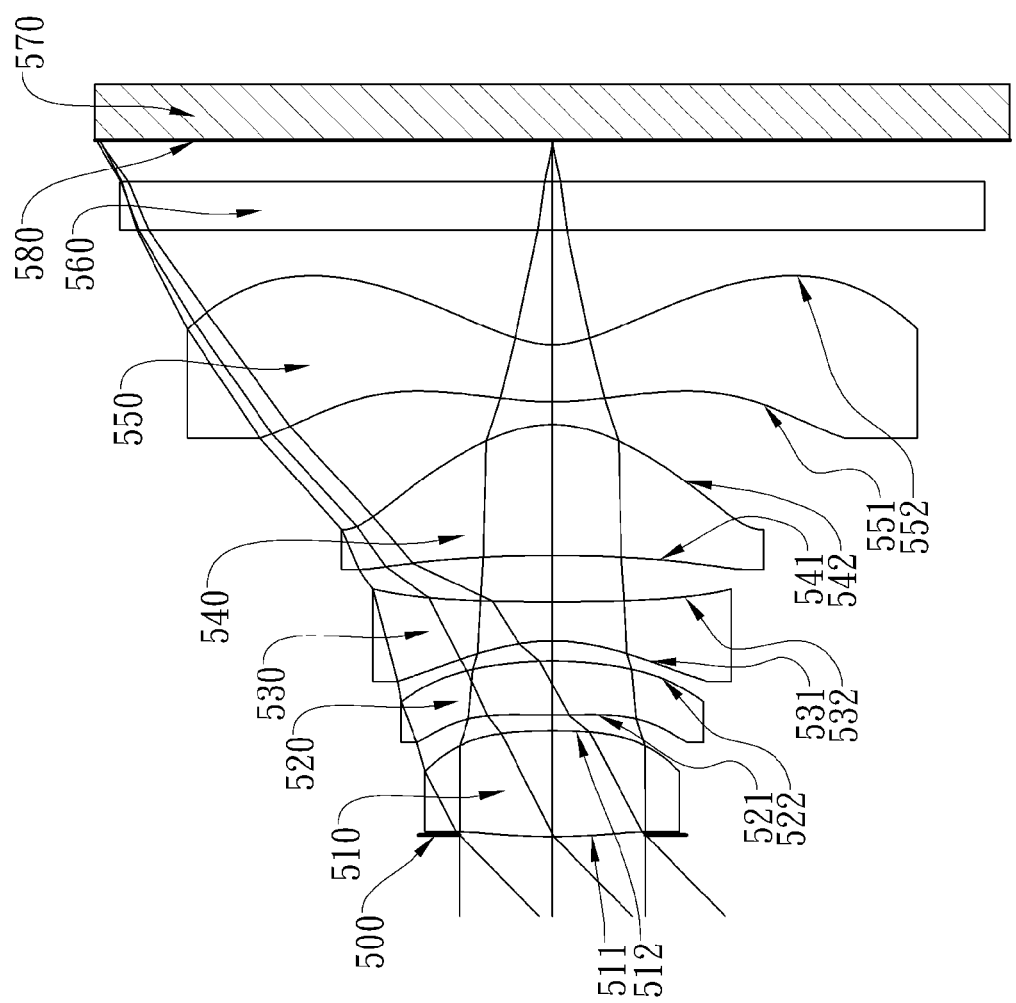
FIG. 5A shows an optical imaging lens system in accordance with the fifth embodiment of the present disclosure.
Figure 5B:
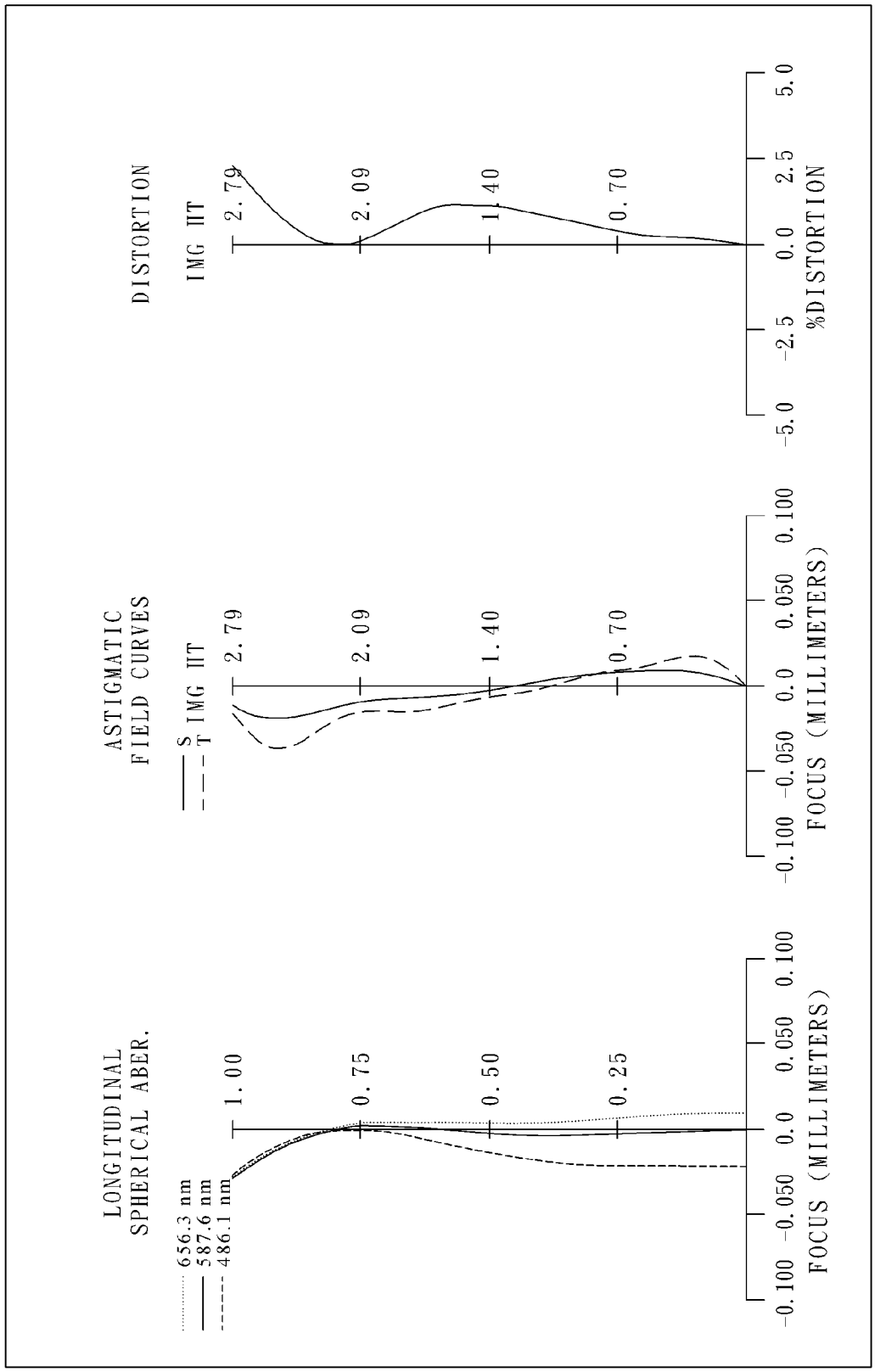
FIG. 5B shows the aberration curves of the fifth embodiment of the present disclosure.

FIG. 5A shows an optical imaging lens system in accordance with the fifth embodiment of the present disclosure, and FIG. 5B shows the aberration curves of the fifth embodiment of the present disclosure. The optical imaging lens system of the fifth embodiment of the present disclosure comprises five lens elements, in order from an object side to an image side:

a first lens element 510 made of plastic with positive refractive power having a convex object-side surface 511 and a convex image-side surface 512, the object-side and image-side surfaces 511 and 512 thereof being aspheric;

a second lens element 520 made of plastic with positive refractive power having a convex object-side surface 521 and a convex image-side surface 522, the object-side and image-side surfaces 521 and 522 thereof being aspheric;

a third lens element 530 made of plastic with negative refractive power having a concave object-side surface 531 and a concave image-side surface 532, the object-side and image-side surfaces 531 and 532 thereof being aspheric;

a fourth lens element 540 made of plastic with positive refractive power having a concave object-side surface 541 and a convex image-side surface 542, the object-side and image-side surfaces 541 and 542 thereof being aspheric; and a fifth lens element 550 made of plastic with negative refractive power having a convex object-side surface 551 and a concave image-side surface 552, the object-side and image-side surfaces 551 and 552 thereof being aspheric, and at least one inflection point is formed on both the object-side surface 551 and the image-side surface 552 thereof;

wherein an aperture stop 500 is disposed between an imaged object and the first lens element 510;

the optical imaging lens system further comprises an IR filter 560 disposed between the image-side surface 552 of the fifth lens element 550 and an image plane 580, and the IR filter 560 is made of glass and has no influence on the focal length of the optical imaging lens system; the optical imaging lens system further comprises an image sensor 570 provided on the image plane 580.

The detailed optical data of the fifth embodiment is shown in TABLE 12, and the aspheric surface data is shown in TABLE 13, wherein the units of the curvature radius, the thickness and the focal length are expressed in mm, and HFOV is half of the maximal field of view.

TABLE 12

(Embodiment 5)
f = 2.79 mm, Fno = 2.45, HFOV = 44.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.010 | | | | |
| 2 | Lens 1 | 3.388 ASP | 0.650 | Plastic | 1.544 | 55.9 | 3.77 |
| 3 | | −4.840 ASP | 0.095 | | | | |
| 4 | Lens 2 | 8.333 ASP | 0.332 | Plastic | 1.640 | 23.3 | 2.89 |
| 5 | | −2.341 ASP | 0.122 | | | | |
| 6 | Lens 3 | −1.198 ASP | 0.240 | Plastic | 1.640 | 23.3 | −1.75 |
| 7 | | 18.766 ASP | 0.285 | | | | |
| 8 | Lens 4 | −10.084 ASP | 0.804 | Plastic | 1.544 | 55.9 | 1.42 |
| 9 | | −0.738 ASP | 0.139 | | | | |
| 10 | Lens 5 | 1.814 ASP | 0.350 | Plastic | 1.544 | 55.9 | −1.68 |
| 11 | | 0.567 ASP | 0.700 | | | | |
| 12 | IR-filter | Plano | 0.300 | Glass | 1.517 | 64.2 | — |
| 13 | | Plano | 0.254 | | | | |
| 14 | Image | Plano | — | | | | |

* Reference wavelength is d-line 587.6 nm

TABLE 13

| Aspheric Coefficients | | | | | |
|---|---|---|---|---|---|
| Surface # | 2 | 3 | 4 | 5 | 6 |
| k = | −5.7243E+01 | −1.0000E+00 | −5.0000E+01 | −1.0000E+00 | −5.0006E+00 |
| A4 = | 8.3565E−02 | −6.6439E−01 | −4.7979E−01 | 1.3416E−01 | 1.3211E−02 |
| A6 = | −5.6216E−01 | 2.5795E−01 | −4.1151E−01 | −6.0805E−01 | −2.2857E−02 |
| A8 = | 7.4081E−01 | 1.3322E−01 | 1.0000E+00 | 5.5352E−01 | −1.2849E−01 |
| A10 = | −1.0716E+00 | −1.1164E−01 | −8.3778E−01 | −3.0215E−01 | 4.3042E−01 |
| A12 = | 3.3213E−02 | −2.9400E−01 | 7.9873E−01 | 3.1155E−01 | −2.8159E−01 |
| A14 = | −7.8812E−02 | 1.4811E−01 | −3.2533E−01 | −1.9156E−01 | |
| Surface # | 7 | 8 | 9 | 10 | 11 |
| k = | −1.0000E+00 | 5.2632E+01 | −3.3186E+00 | −3.2810E+01 | −4.1704E+00 |
| A4 = | 5.9408E−02 | −4.4599E−02 | −1.7757E−01 | −7.1090E−02 | −9.6884E−02 |
| A6 = | −9.8947E−02 | 1.3683E−01 | 1.9655E−01 | −1.1615E−02 | 4.0171E−02 |
| A8 = | 1.1518E−01 | −2.5423E−01 | −1.6401E−01 | 8.4714E−03 | −1.3119E−02 |
| A10 = | −4.7911E−02 | 2.6191E−01 | 6.6332E−02 | −4.2267E−04 | 2.2835E−03 |
| A12 = | 4.1173E−03 | −1.3618E−01 | 4.0806E−03 | −1.6058E−04 | −1.8294E−04 |
| A14 = | | 2.9532E−02 | −4.1075E−03 | 1.3522E−05 | 4.2143E−06 |

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 14.

TABLE 14

(Embodiment 5)

| f | 2.79 | R8/f | −0.26 |
|---|---|---|---|
| Fno | 2.45 | R10/f | 0.20 |
| HFOV [deg.] | 44.4 | (SD52−SD42)/TD | 0.31 |
| V1−V3 | 32.6 | Yp52/SD52 | 0.66 |
| T34/T23 | 2.34 | TTL [mm] | 4.17 |
| ΣCT/TD | 0.79 | TTL/ImgH | 1.49 |

Embodiment 6

Figure 6A:
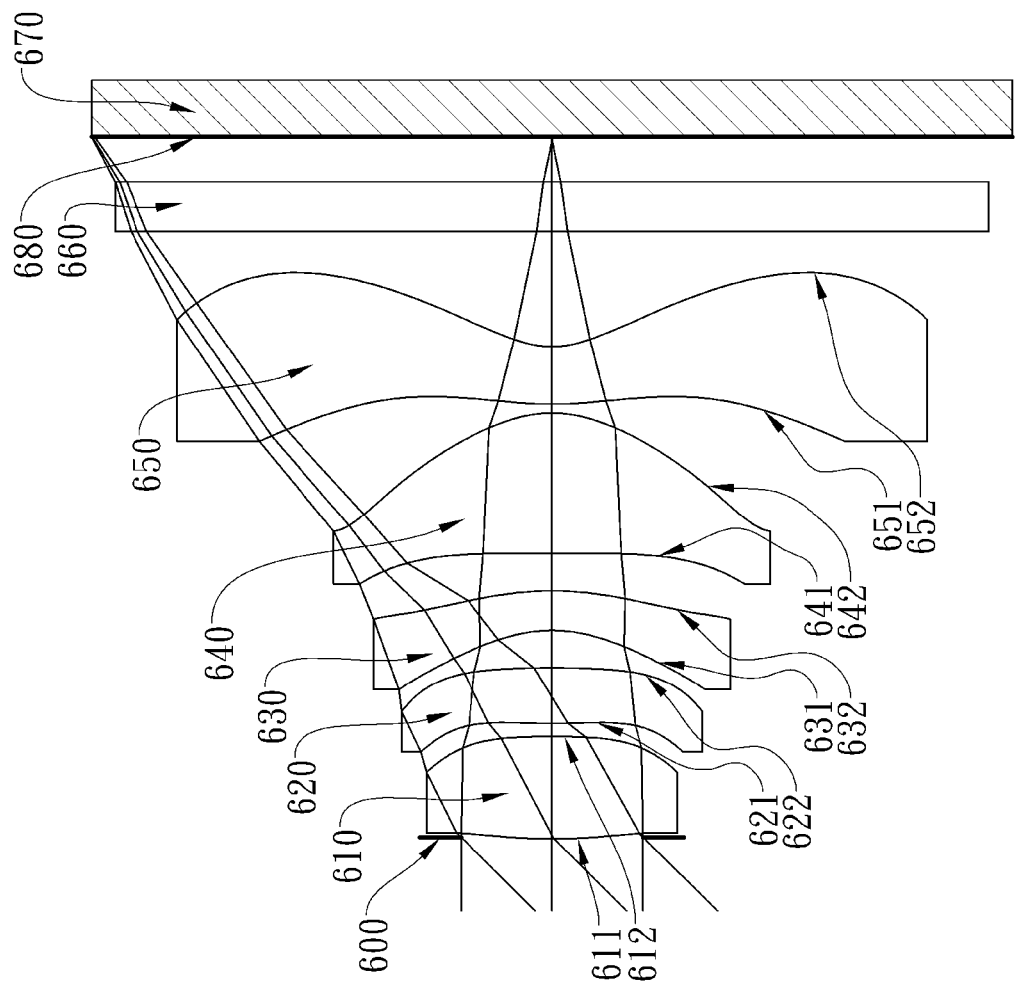
FIG. 6A shows an optical imaging lens system in accordance with the sixth embodiment of the present disclosure.
Figure 6B:
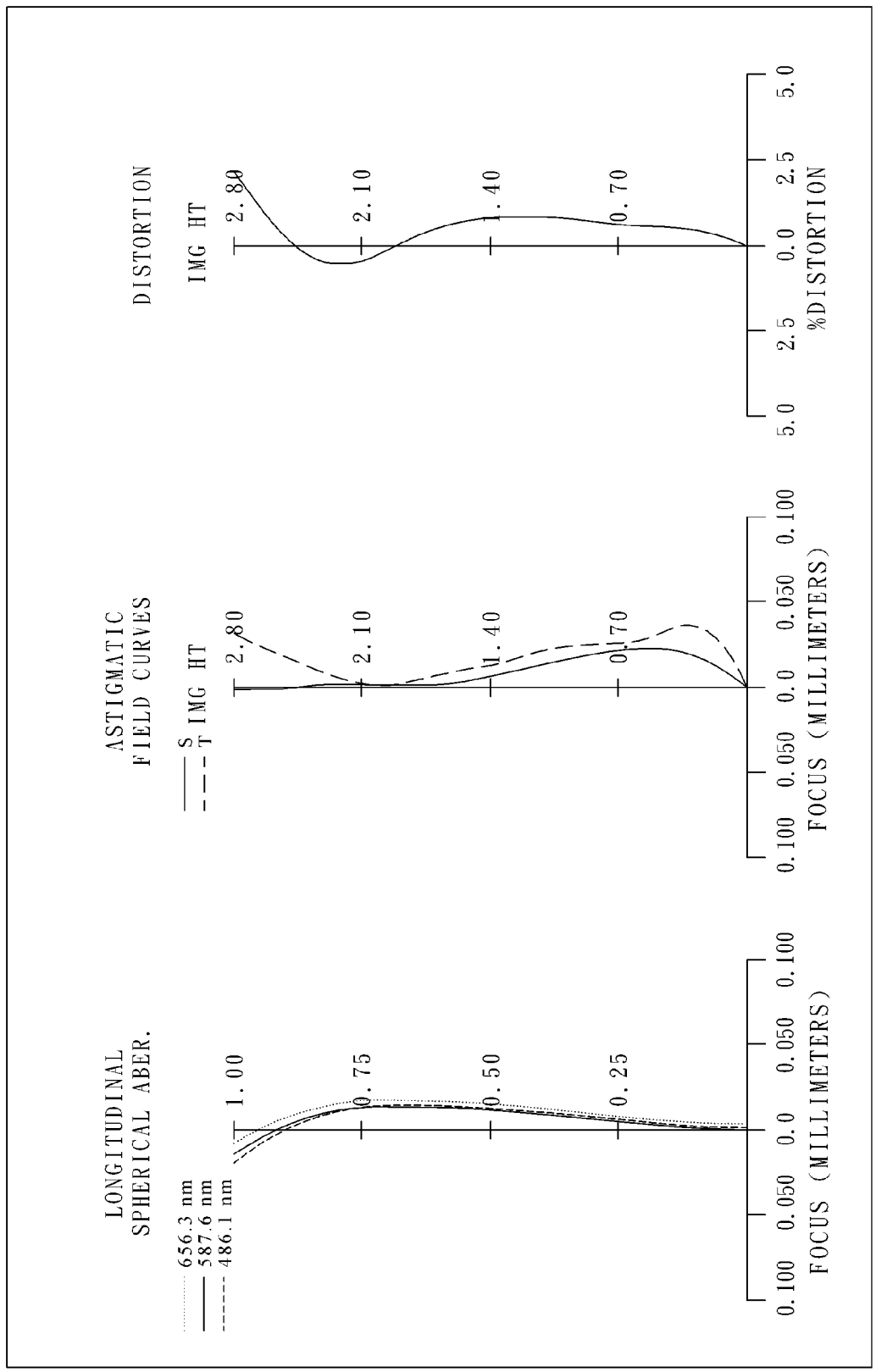
FIG. 6B shows the aberration curves of the sixth embodiment of the present disclosure.

FIG. 6A shows an optical imaging lens system in accordance with the sixth embodiment of the present disclosure, and FIG. 6B shows the aberration curves of the sixth embodiment of the present disclosure. The optical imaging lens system of the sixth embodiment of the present disclosure comprises five lens elements, in order from an object side to an image side:

a first lens element 610 made of plastic with positive refractive power having a convex object-side surface 611 and a convex image-side surface 612, the object-side and image-side surfaces 611 and 612 thereof being aspheric;

a second lens element 620 made of plastic with positive refractive power having a convex object-side surface 621 and a convex image-side surface 622, the object-side and image-side surfaces 621 and 622 thereof being aspheric;

a third lens element 630 made of plastic with negative refractive power having a concave object-side surface 631 and a convex image-side surface 632, the object-side and image-side surfaces 631 and 632 thereof being aspheric;

a fourth lens element 640 made of plastic with positive refractive power having a convex object-side surface 641 and a convex image-side surface 642, the object-side and image-side surfaces 641 and 642 thereof being aspheric; and a fifth lens element 650 made of plastic with negative refractive power having a convex object-side surface 651 and a concave image-side surface 652, the object-side and image-side surfaces 651 and 652 thereof being aspheric, and at least one inflection point is formed on both the object-side surface 651 and the image-side surface 652 thereof;

wherein an aperture stop 600 is disposed between an imaged object and the first lens element 610;

the optical imaging lens system further comprises an IR filter 660 disposed between the image-side surface 652 of the fifth lens element 650 and an image plane 680, and the IR filter 660 is made of glass and has no influence on the focal length of the optical imaging lens system; the optical imaging lens system further comprises an image sensor 670 provided on the image plane 680.

The detailed optical data of the sixth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

(Embodiment 6)
f = 2.72 mm, Fno = 2.45, HFOV = 45.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.010 | | | | |
| 2 | Lens 1 | 3.264 | ASP | 0.621 | Plastic | 1.544 | 55.9 | 4.24 |
| 3 | | −7.333 | ASP | 0.080 | | | | |
| 4 | Lens 2 | 5.131 | ASP | 0.339 | Plastic | 1.544 | 55.9 | 4.77 |
| 5 | | −5.138 | ASP | 0.228 | | | | |
| 6 | Lens 3 | −0.859 | ASP | 0.240 | Plastic | 1.650 | 21.4 | −2.79 |
| 7 | | −1.811 | ASP | 0.225 | | | | |
| 8 | Lens 4 | 21.597 | ASP | 0.857 | Plastic | 1.544 | 55.9 | 1.27 |
| 9 | | −0.705 | ASP | 0.053 | | | | |
| 10 | Lens 5 | 1.969 | ASP | 0.350 | Plastic | 1.544 | 55.9 | −1.39 |
| 11 | | 0.512 | ASP | 0.700 | | | | |
| 12 | IR-filter | Plano | | 0.300 | Glass | 1.517 | 64.2 | — |
| 13 | | Plano | | 0.277 | | | | |
| 14 | Image | Plano | | — | | | | |

\* Reference wavelength is d-line 587.6 nm

TABLE 16

Aspheric Coefficients

| Surface # | 2 | 3 | 4 | 5 | 6 |
|---|---|---|---|---|---|
| k = | −5.9620E+01 | −1.0000E+00 | −3.3273E+01 | −1.0000E+00 | −2.9495E+00 |
| A4 = | 1.2339E−01 | −5.9847E−01 | −4.5413E−01 | 6.1524E−02 | 4.0546E−02 |
| A6 = | −6.0685E−01 | 1.1106E−01 | −5.2649E−01 | −6.6780E−01 | −3.3392E−02 |
| A8 = | 8.7160E−01 | 3.7865E−02 | 7.7846E−01 | 5.3497E−01 | −1.7102E−01 |
| A10 = | −1.1334E+00 | 1.0463E−01 | −7.9504E−01 | −3.6689E−01 | 3.9552E−01 |
| A12 = | 3.3214E−02 | −2.9400E−01 | 9.5245E−01 | 2.5933E−01 | −2.5483E−01 |
| A14 = | −7.8811E−02 | 1.4811E−01 | −3.2533E−01 | −1.3027E−01 | |

| Surface # | 7 | 8 | 9 | 10 | 11 |
|---|---|---|---|---|---|
| k = | −5.7487E+00 | −5.0000E+01 | −4.1356E+00 | −5.0000E+01 | −4.2866E+00 |
| A4 = | 8.2472E−02 | −1.7007E−01 | −1.9933E−01 | −9.6395E−02 | −9.2365E−02 |
| A6 = | −7.9748E−02 | 1.6056E−01 | 1.9358E−01 | 1.0604E−02 | 3.8789E−02 |
| A8 = | 1.1660E−01 | −2.6474E−01 | −1.6756E−01 | 6.8720E−03 | −1.1941E−02 |
| A10 = | −5.3750E−02 | 2.6189E−01 | 6.3107E−02 | −1.4352E−03 | 1.9956E−03 |
| A12 = | −4.9693E−03 | −1.3406E−01 | 3.3560E−03 | −2.5034E−04 | −1.5943E−04 |
| A14 = | | 2.7229E−02 | −3.0131E−03 | 6.4333E−05 | 3.8034E−06 |

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 17.

TABLE 17

(Embodiment 6)

| f | 2.72 | R8/f | −0.26 |
|---|---|---|---|
| Fno | 2.45 | R10/f | 0.19 |
| HFOV [deg.] | 45.2 | (SD52-SD42)/TD | 0.32 |
| V1-V3 | 34.5 | Yp52/SD52 | 0.68 |
| T34/T23 | 0.99 | TTL [mm] | 4.17 |
| ΣCT/TD | 0.80 | TTL/ImgH | 1.49 |

Embodiment 7

Figure 7A:
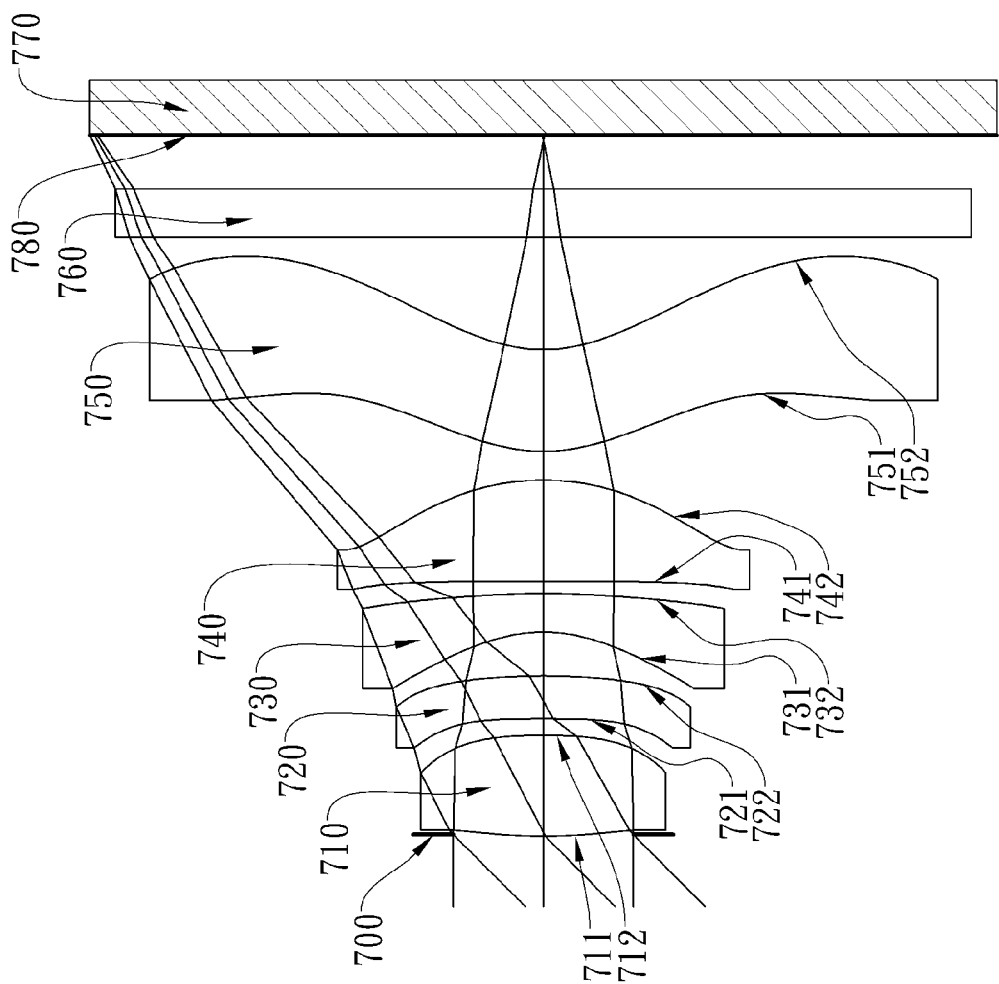
FIG. 7A shows an optical imaging lens system in accordance with the seventh embodiment of the present disclosure.
Figure 7B:
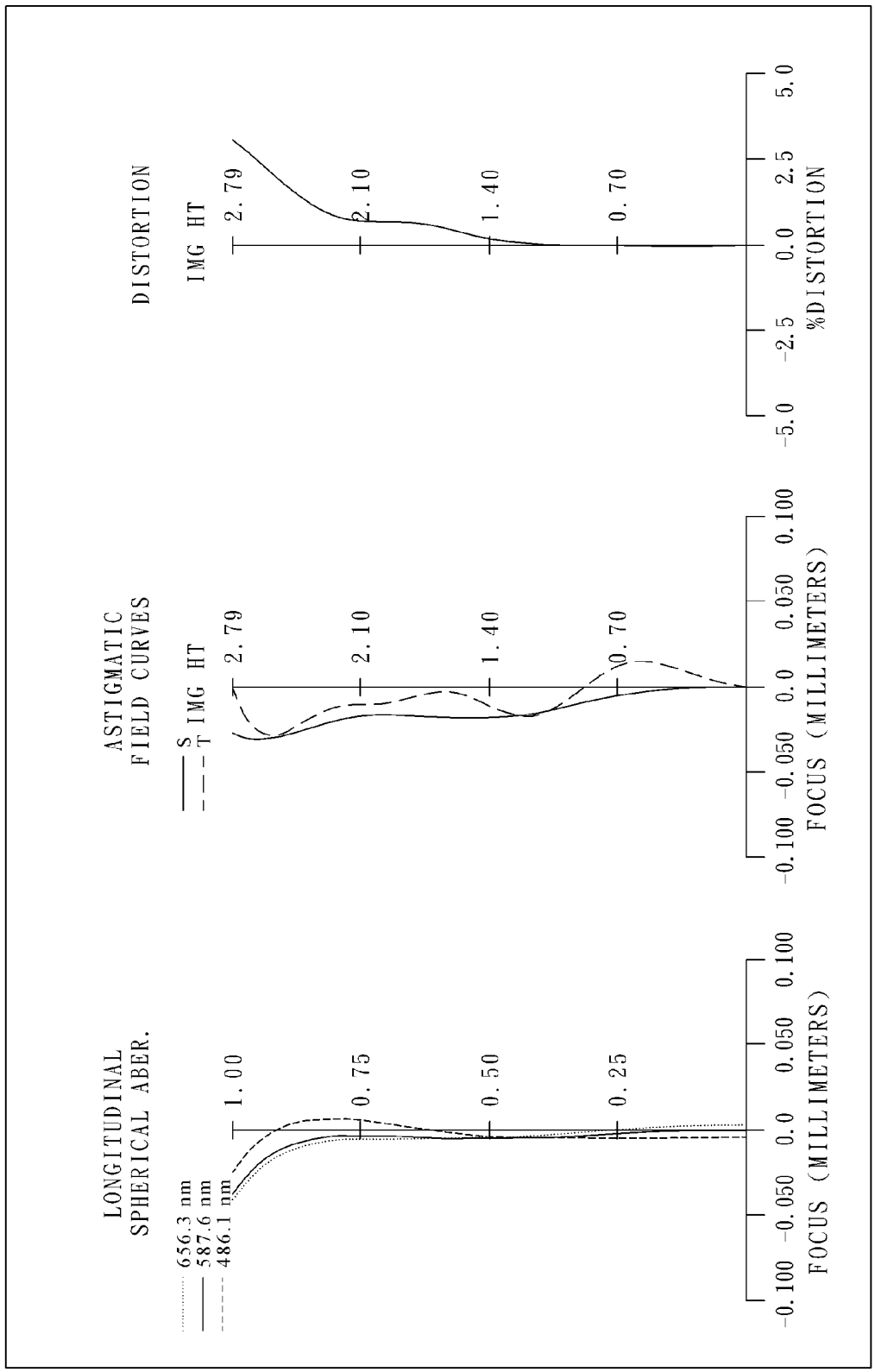
FIG. 7B shows the aberration curves of the seventh embodiment of the present disclosure.

FIG. 7A shows an optical imaging lens system in accordance with the seventh embodiment of the present disclosure, and FIG. 7B shows the aberration curves of the seventh embodiment of the present disclosure. The optical imaging lens system of the seventh embodiment of the present disclosure comprises five lens elements, in order from an object side to an image side:

a first lens element 710 made of plastic with positive refractive power having a convex object-side surface 711 and a convex image-side surface 712, the object-side and image-side surfaces 711 and 712 thereof being aspheric;

a second lens element 720 made of plastic with positive refractive power having a concave object-side surface 721 and a convex image-side surface 722, the object-side and image-side surfaces 721 and 722 thereof being aspheric;

a third lens element 730 made of plastic with negative refractive power having a concave object-side surface 731 and a convex image-side surface 732, the object-side and image-side surfaces 731 and 732 thereof being aspheric;

a fourth lens element 740 made of plastic with positive refractive power having a concave object-side surface 741 and a convex image-side surface 742, the object-side and image-side surfaces 741 and 742 thereof being aspheric; and a fifth lens element 750 made of plastic with positive refractive power having a convex object-side surface 751 and a concave image-side surface 752, the object-side and image-side surfaces 751 and 752 thereof being aspheric, and at least one inflection point is formed on both the object-side surface 751 and the image-side surface 752 thereof;

wherein an aperture stop 700 is disposed between an imaged object and the first lens element 710;

the optical imaging lens system further comprises an IR filter 760 disposed between the image-side surface 752 of the fifth lens element 750 and an image plane 780, and the IR filter 760 is made of glass and has no influence on the focal length of the optical imaging lens system; the optical imaging lens system further comprises an image sensor 770 provided on the image plane 780.

The detailed optical data of the seventh embodiment is shown in TABLE 18, and the aspheric surface data is shown in TABLE 19, wherein the units of the curvature radius, the thickness and the focal length are expressed in mm, and HFOV is half of the maximal field of view.

TABLE 18

(Embodiment 7)
f = 2.74 mm, Fno = 2.45, HFOV = 44.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.012 | | | | |
| 2 | Lens 1 | 3.044 ASP | 0.629 | Plastic | 1.535 | 56.3 | 3.27 |
| 3 | | −3.805 ASP | 0.102 | | | | |
| 4 | Lens 2 | −17.682 ASP | 0.268 | Plastic | 1.634 | 23.8 | 8.22 |
| 5 | | −4.049 ASP | 0.274 | | | | |
| 6 | Lens 3 | −0.925 ASP | 0.240 | Plastic | 1.634 | 23.8 | −1.88 |
| 7 | | −4.578 ASP | 0.075 | | | | |
| 8 | Lens 4 | −65.199 ASP | 0.631 | Plastic | 1.544 | 55.9 | 2.91 |
| 9 | | −1.551 ASP | 0.179 | | | | |
| 10 | Lens 5 | 1.061 ASP | 0.633 | Plastic | 1.544 | 55.9 | 18.17 |
| 11 | | 0.938 ASP | 0.700 | | | | |
| 12 | IR-filter | Plano | 0.300 | Glass | 1.517 | 64.2 | — |
| 13 | | Plano | 0.336 | | | | |
| 14 | Image | Plano | — | | | | |

* Reference wavelength is d-line 587.6 nm

TABLE 19

| Aspheric Coefficients | | | | | |
|---|---|---|---|---|---|
| Surface # | 2 | 3 | 4 | 5 | 6 |
| k = | −4.6033E+01 | −1.0000E+00 | −1.4833E+01 | −1.0000E+00 | −4.27803E+00 |
| A4 = | 1.1360E−01 | −4.4679E−01 | −2.8922E−01 | 8.8274E−02 | −8.12057E−02 |
| A6 = | −5.3259E−01 | −9.7161E−02 | −5.1584E−01 | −4.9045E−01 | −2.86822E−02 |
| A8 = | 6.1154E−01 | 2.2254E−01 | 8.6943E−01 | 5.2088E−01 | −7.73068E−02 |
| A10 = | −8.9683E−01 | −7.1436E−02 | −8.1948E−01 | −4.1047E−01 | 4.54747E−01 |
| A12 = | 3.3212E−02 | −2.9400E−01 | 7.5114E−01 | 3.2347E−01 | −3.38013E−01 |
| A14 = | −7.8813E−02 | 1.4811E−01 | −3.2533E−01 | −2.1229E−01 | |

| Surface # | 7 | 8 | 9 | 10 | 11 |
|---|---|---|---|---|---|
| k = | −5.0000E+01 | 8.9158E+02 | −9.1704E−01 | −3.4146E+00 | −1.6380E+00 |
| A4 = | 6.9569E−02 | −2.0845E−02 | −1.2200E−01 | −4.2030E−02 | −1.4795E−01 |
| A6 = | −1.4718E−01 | 9.7413E−02 | 2.0598E−01 | −1.8744E−02 | 5.6785E−02 |
| A8 = | 1.1647E−01 | −2.4135E−01 | −1.6665E−01 | 7.9622E−03 | −1.5201E−02 |
| A10 = | −3.6458E−02 | 2.6211E−01 | 6.8245E−02 | −4.2170E−04 | 2.4266E−03 |
| A12 = | 1.0391E−03 | −1.4000E−01 | 4.8586E−03 | −1.4169E−04 | −2.0163E−04 |
| A14 = | | 2.9203E−02 | −5.5745E−03 | 1.5094E−05 | 6.4568E−06 |

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 20.

TABLE 20

(Embodiment 7)

| | | | |
|---|---|---|---|
| f | 2.74 | R8/f | −0.57 |
| Fno | 2.45 | R10/f | 0.34 |
| HFOV [deg.] | 44.7 | (SD52-SD42)/TD | 0.39 |
| V1-V3 | 32.5 | Yp52/SD52 | 0.76 |
| T34/T23 | 0.27 | TTL [mm] | 4.27 |
| ΣCT/TD | 0.79 | TTL/ImgH | 1.53 |

Embodiment 8

Figure 8A:
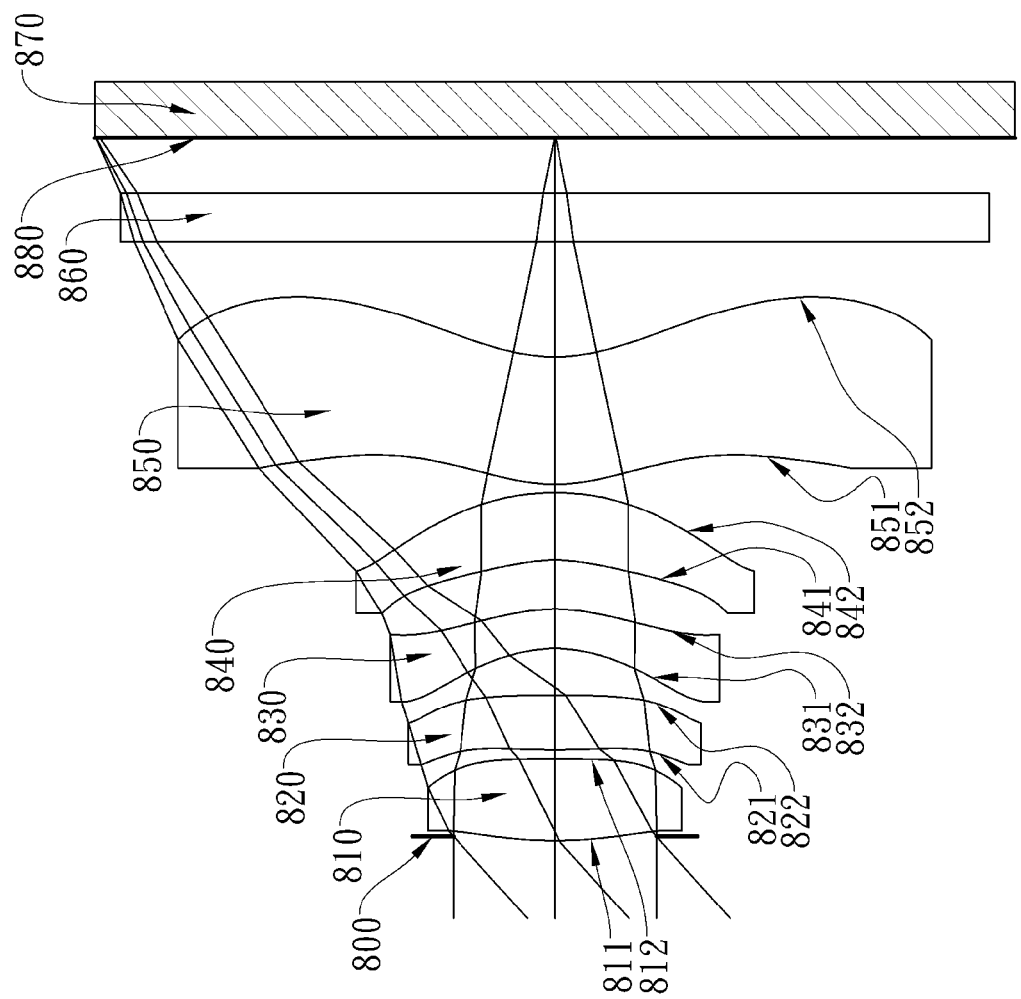
FIG. 8A shows an optical imaging lens system in accordance with the eighth embodiment of the present disclosure.
Figure 8B:
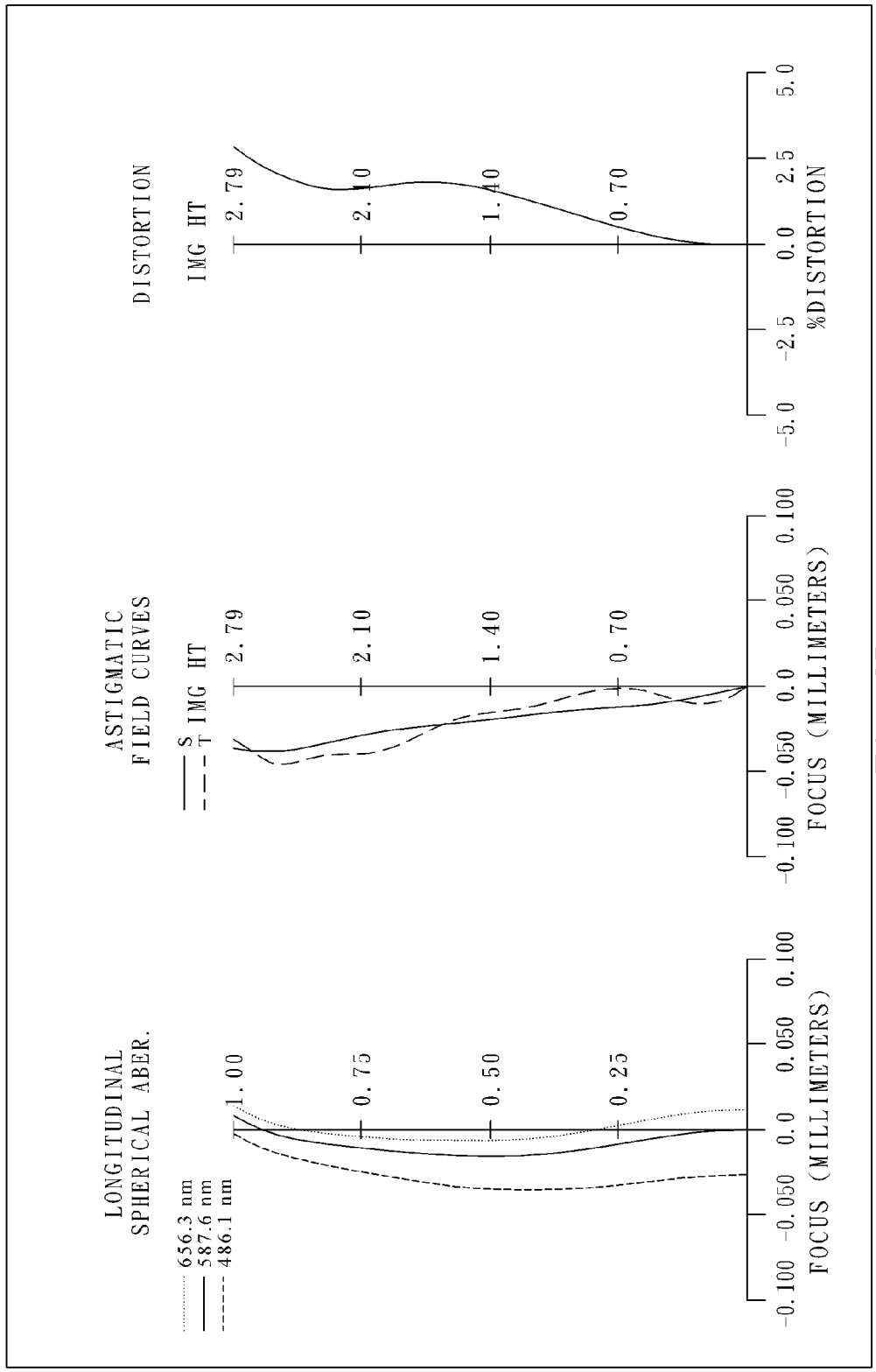
FIG. 8B shows the aberration curves of the eighth embodiment of the present disclosure.

FIG. 8A shows an optical imaging lens system in accordance with the eighth embodiment of the present disclosure, and FIG. 8B shows the aberration curves of the eighth embodiment of the present disclosure. The optical imaging lens system of the eighth embodiment of the present disclosure comprises five lens elements, in order from an object side to an image side:

a first lens element 810 made of plastic with positive refractive power having a convex object-side surface 811 and a convex image-side surface 812, the object-side and image-side surfaces 811 and 812 thereof being aspheric;

a second lens element 820 made of plastic with positive refractive power having a convex object-side surface 821 and a convex image-side surface 822, the object-side and image-side surfaces 821 and 822 thereof being aspheric;

a third lens element 830 made of plastic with negative refractive power having a concave object-side surface 831 and a convex image-side surface 832, the object-side and image-side surfaces 831 and 832 thereof being aspheric;

a fourth lens element 840 made of plastic with negative refractive power having a concave object-side surface 841 and a convex image-side surface 842, the object-side and image-side surfaces 841 and 842 thereof being aspheric; and a fifth lens element 850 made of plastic with positive refractive power having a convex object-side surface 851 and a concave image-side surface 852, the object-side and image-side surfaces 851 and 852 thereof being aspheric, and at least one inflection point is formed on both the object-side surface 851 and the image-side surface 852 thereof;

wherein an aperture stop 800 is disposed between an imaged object and the first lens element 810;

the optical imaging lens system further comprises an IR filter 860 disposed between the image-side surface 852 of the fifth lens element 850 and an image plane 880, and the IR filter 860 is made of glass and has no influence on the focal length of the optical imaging lens system; the optical imaging lens system further comprises an image sensor 870 provided on the image plane 880.

The detailed optical data of the eighth embodiment is shown in TABLE 21, and the aspheric surface data is shown in TABLE 22, wherein the units of the curvature radius, the thickness and the focal length are expressed in mm, and HFOV is half of the maximal field of view.

TABLE 21

(Embodiment 8)
f = 3.03 mm, Fno = 2.45, HFOV = 42.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.028 | | | | |
| 2 | Lens 1 | 2.382 | ASP | 0.499 | Plastic | 1.535 | 56.3 | 4.63 |
| 3 | | 57.604 | ASP | 0.056 | | | | |
| 4 | Lens 2 | 4.240 | ASP | 0.334 | Plastic | 1.543 | 56.5 | 5.35 |
| 5 | | −9.007 | ASP | 0.284 | | | | |
| 6 | Lens 3 | −0.875 | ASP | 0.240 | Plastic | 1.633 | 23.4 | −10.45 |
| 7 | | −1.116 | ASP | 0.300 | | | | |
| 8 | Lens 4 | −0.983 | ASP | 0.412 | Plastic | 1.535 | 56.3 | −8.41 |
| 9 | | −1.441 | ASP | 0.050 | | | | |
| 10 | Lens 5 | 0.995 | ASP | 0.776 | Plastic | 1.535 | 56.3 | 6.17 |
| 11 | | 1.038 | ASP | 0.700 | | | | |
| 12 | IR-filter | Plano | | 0.300 | Glass | 1.517 | 64.2 | — |
| 13 | | Plano | | 0.335 | | | | |
| 14 | Image | Plano | | — | | | | |

* Reference wavelength is d-line 587.6 nm

TABLE 22

Aspheric Coefficients

| Surface # | 2 | 3 | 4 | 5 | 6 |
|---|---|---|---|---|---|
| k = | −2.4947E+01 | −1.0000E+00 | −4.1294E+01 | −1.0000E+00 | −3.3067E+00 |
| A4 = | 1.3878E−01 | −4.9242E−01 | −3.1544E−01 | −6.9176E−02 | −1.0547E−01 |
| A6 = | −5.0100E−01 | −1.7984E−01 | −4.6847E−01 | −4.8088E−01 | −3.5225E−02 |
| A8 = | 5.2149E−01 | 4.2605E−01 | 8.3515E−01 | 4.7246E−01 | −3.6034E−02 |
| A10 = | −7.7841E−01 | −1.0606E−01 | −7.5708E−01 | −4.7416E−01 | 5.3287E−01 |
| A12 = | 3.3210E−02 | −2.9401E−01 | 9.3521E−01 | 4.0126E−01 | −2.8283E−01 |
| A14 = | −7.8813E−02 | 1.4811E−01 | −3.2533E−01 | 9.1082E−02 | |

TABLE 22-continued

Aspheric Coefficients

| Surface # | 7 | 8 | 9 | 10 | 11 |
|---|---|---|---|---|---|
| k = | −6.1402E+00 | −1.3167E+00 | −1.0585E+00 | −7.5436E+00 | −3.4583E+00 |
| A4 = | 1.5159E−01 | 4.4575E−02 | −1.1576E−01 | −1.1405E−01 | −9.8305E−02 |
| A6 = | −1.1725E−01 | −1.6476E−02 | 2.0892E−01 | 1.7707E−02 | 3.8996E−02 |
| A8 = | 1.2140E−01 | −2.2692E−01 | −1.8245E−01 | 6.6623E−03 | −1.1905E−02 |
| A10 = | −3.8664E−02 | 2.7212E−01 | 6.4774E−02 | −1.5898E−03 | 2.1666E−03 |
| A12 = | 2.5521E−03 | −1.4213E−01 | 7.0757E−03 | −2.0072E−04 | −2.0236E−04 |
| A14 = | | 1.1173E−02 | −3.4942E−03 | 5.1018E−05 | 6.5015E−06 |

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 23.

TABLE 23

(Embodiment 8)

| f | 3.03 | R8/f | −0.48 |
|---|---|---|---|
| Fno | 2.45 | R10/f | 0.34 |
| HFOV [deg.] | 42.0 | (SD52-SD42)/TD | 0.37 |
| V1-V3 | 32.9 | Yp52/SD52 | 0.68 |
| T34/T23 | 1.06 | TTL [mm] | 4.18 |
| ΣCT/TD | 0.77 | TTL/ImgH | 1.50 |

Embodiment 9

Figure 9A:
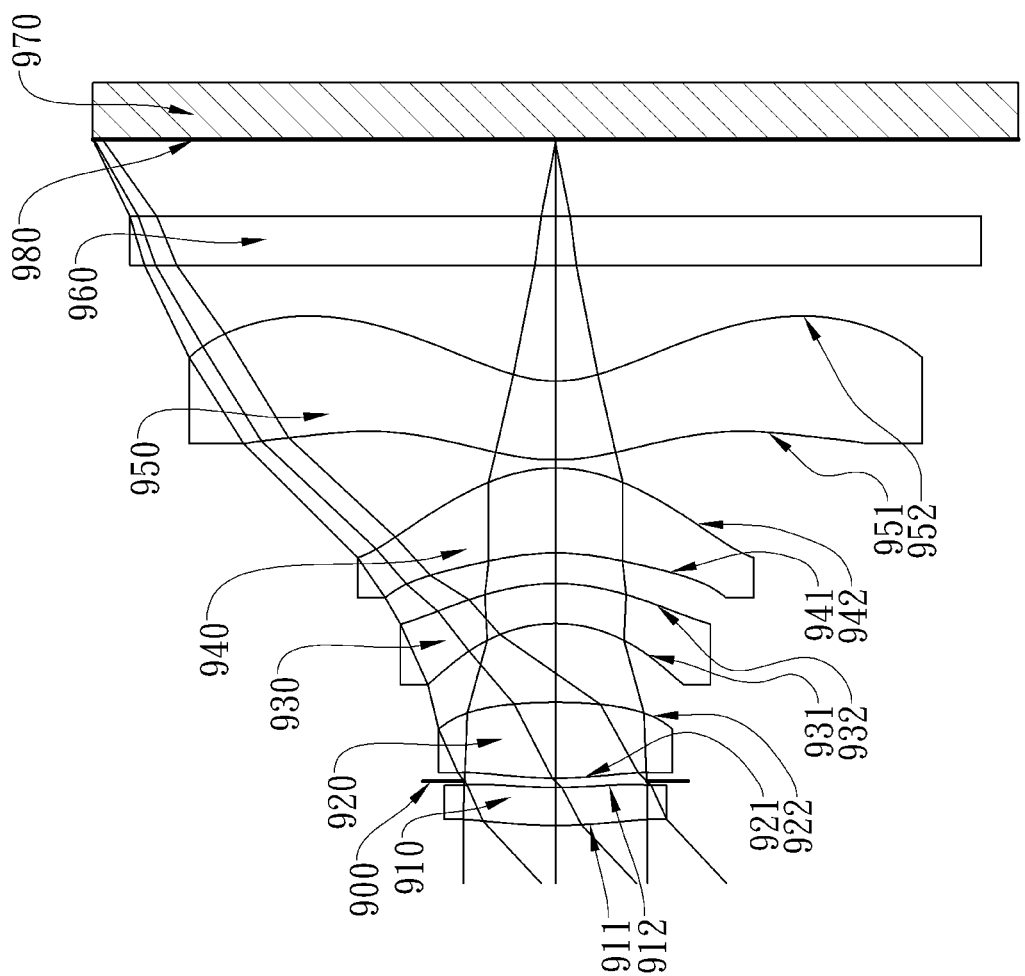
FIG. 9A shows an optical imaging lens system in accordance with the ninth embodiment of the present disclosure.
Figure 9B:
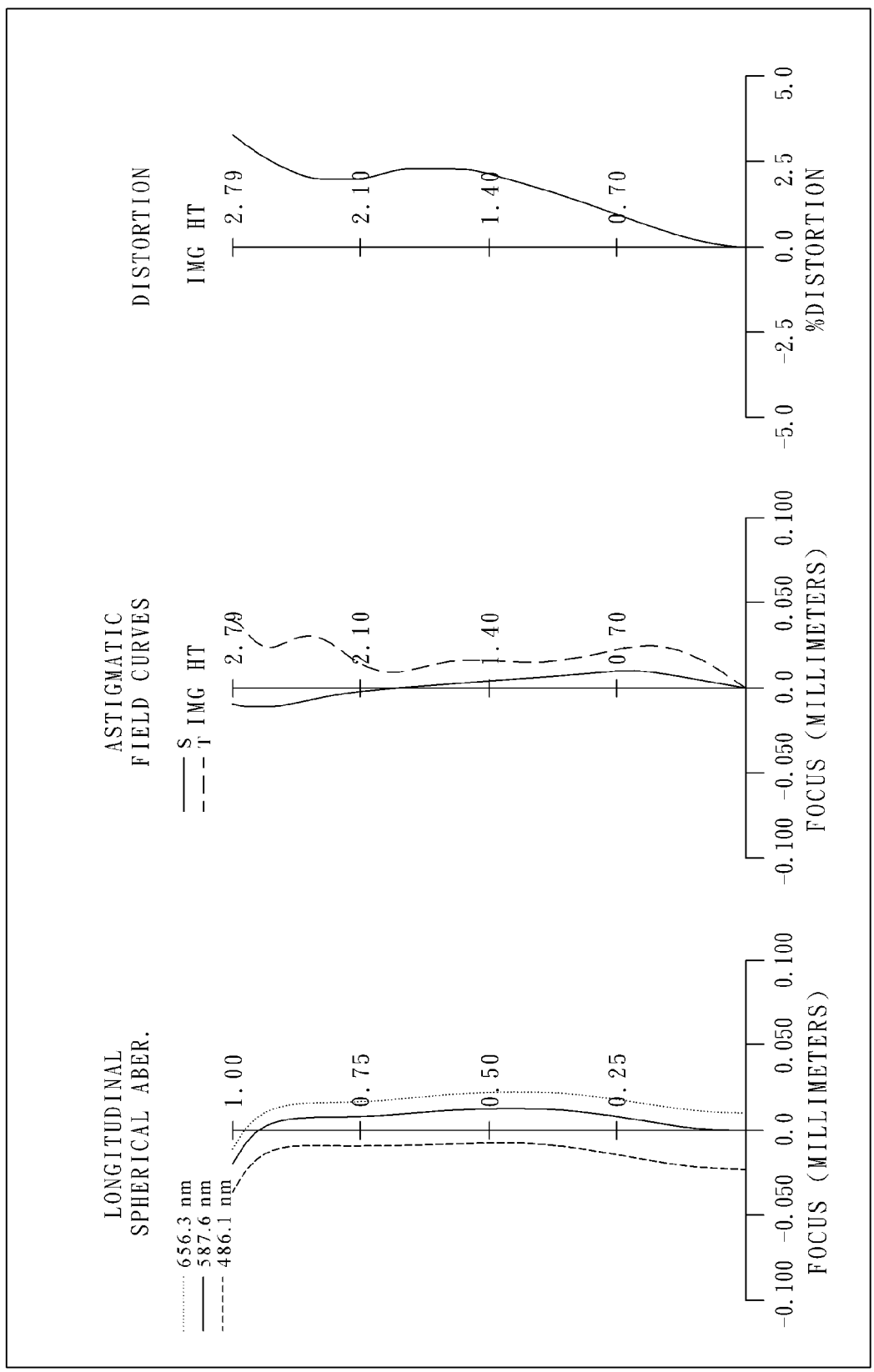
FIG. 9B shows the aberration curves of the ninth embodiment of the present disclosure.

FIG. 9A shows an optical imaging lens system in accordance with the ninth embodiment of the present disclosure, and FIG. 9B shows the aberration curves of the ninth embodiment of the present disclosure. The optical imaging lens system of the ninth embodiment of the present disclosure comprises five lens elements, in order from an object side to an image side:

a first lens element 910 made of plastic with positive refractive power having a convex object-side surface 911 and a concave image-side surface 912, the object-side and image-side surfaces 911 and 912 thereof being aspheric;

a second lens element 920 made of plastic with positive refractive power having a convex object-side surface 921 and a convex image-side surface 922, the object-side and image-side surfaces 921 and 922 thereof being aspheric;

a third lens element 930 made of plastic with negative refractive power having a concave object-side surface 931 and a convex image-side surface 932, the object-side and image-side surfaces 931 and 932 thereof being aspheric;

a fourth lens element 940 made of plastic with positive refractive power having a concave object-side surface 941 and a convex image-side surface 942, the object-side and image-side surfaces 941 and 942 thereof being aspheric; and a fifth lens element 950 made of plastic with negative refractive power having a convex object-side surface 951 and a concave image-side surface 952, the object-side and image-side surfaces 951 and 952 thereof being aspheric, and at least one inflection point is formed on both the object-side surface 951 and the image-side surface 952 thereof;

wherein an aperture stop 900 is disposed between the first lens element 910 and the second lens element 920;

the optical imaging lens system further comprises an IR filter 960 disposed between the image-side surface 952 of the fifth lens element 950 and an image plane 980, and the IR filter 960 is made of glass and has no influence on the focal length of the optical imaging lens system; the optical imaging lens system further comprises an image sensor 970 provided on the image plane 980.

The detailed optical data of the ninth embodiment is shown in TABLE 24, and the aspheric surface data is shown in TABLE 25, wherein the units of the curvature radius, the thickness and the focal length are expressed in mm, and HFOV is half of the maximal field of view.

TABLE 24

(Embodiment 9)
f = 2.90 mm, Fno = 2.60, HFOV = 43.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.713 | ASP | 0.230 | Plastic | 1.530 | 55.8 | 47.39 |
| 2 | | 2.952 | ASP | 0.038 | | | | |
| 3 | Ape. Stop | Plano | | 0.019 | | | | |
| 4 | Lens 2 | 2.462 | ASP | 0.459 | Plastic | 1.543 | 56.5 | 2.66 |
| 5 | | −3.268 | ASP | 0.478 | | | | |
| 6 | Lens 3 | −0.867 | ASP | 0.243 | Plastic | 1.633 | 23.4 | −6.29 |
| 7 | | −1.230 | ASP | 0.185 | | | | |
| 8 | Lens 4 | −1.405 | ASP | 0.514 | Plastic | 1.535 | 56.3 | 3.56 |
| 9 | | −0.911 | ASP | 0.050 | | | | |
| 10 | Lens 5 | 1.254 | ASP | 0.477 | Plastic | 1.535 | 56.3 | −5.27 |
| 11 | | 0.753 | ASP | 0.700 | | | | |
| 12 | IR-filter | Plano | | 0.300 | Glass | 1.517 | 64.2 | — |
| 13 | | Plano | | 0.465 | | | | |
| 14 | Image | Plano | | — | | | | |

* Reference wavelength is d-line 587.6 nm

TABLE 25

Aspheric Coefficients

| Surface # | 1 | 2 | 4 | 5 | 6 |
|---|---|---|---|---|---|
| k = | −3.9099E+01 | −1.0000E+00 | −1.0000E+00 | −1.0000E+00 | −1.8147E+00 |
| A4 = | 5.3320E−02 | −3.6204E−01 | −2.1943E−01 | −1.5939E−01 | −2.4323E−01 |
| A6 = | −5.8767E−01 | −2.6635E−01 | −2.6629E−01 | −3.1484E−01 | −9.2421E−02 |
| A8 = | 6.7203E−01 | 5.2311E−01 | 2.4003E−01 | 1.9911E−01 | 3.5539E−02 |
| A10 = | −4.1654E−01 | −1.9004E−02 | −9.5375E−01 | −7.3185E−01 | 6.6586E−01 |
| A12 = | 7.6373E−02 | −2.5156E−01 | 9.0016E−01 | 3.8147E−01 | −3.5855E−01 |
| A14 = | −5.9675E−02 | 1.1858E−01 | −3.3912E−01 | −1.3840E−01 | |

| Surface # | 7 | 8 | 9 | 10 | 11 |
|---|---|---|---|---|---|
| k = | −3.4448E+00 | −9.2840E+00 | −2.5735E+00 | −6.9507E+00 | −3.7669E+00 |
| A4 = | 5.9776E−02 | 7.3505E−02 | −1.1832E−01 | −9.4251E−02 | −1.0213E−01 |
| A6 = | −1.1676E−01 | −1.6206E−02 | 1.8923E−01 | 6.2417E−03 | 3.9678E−02 |
| A8 = | 1.4246E−01 | −2.3050E−01 | −1.7673E−01 | 7.7090E−03 | −1.2235E−02 |
| A10 = | −2.7984E−02 | 2.6607E−01 | 7.3415E−02 | −1.2332E−03 | 2.1624E−03 |
| A12 = | −7.4004E−03 | −1.2933E−01 | 8.8533E−03 | −1.7613E−04 | −1.6883E−04 |
| A14 = | | 7.0959E−03 | −7.4910E−03 | 3.3811E−05 | 1.8718E−06 |

The equation of the aspheric surface profiles of the ninth embodiment has the same form as that of the first embodiment. Moreover, the description of the factors in the relations is as those set forth in the first embodiment, but the values of the relations of the ninth embodiment are listed in the following TABLE 26.

TABLE 26

(Embodiment 9)

| f | 2.90 | R8/f | −0.31 |
|---|---|---|---|
| Fno | 2.60 | R10/f | 0.26 |
| HFOV [deg.] | 43.0 | (SD52−SD42)/TD | 0.38 |
| V1−V3 | 32.4 | Yp52/SD52 | 0.67 |
| T34/T23 | 0.39 | TTL [mm] | 4.06 |
| ΣCT/TD | 0.71 | TTL/ImgH | 1.45 |

Embodiment 10

Figure 10A:
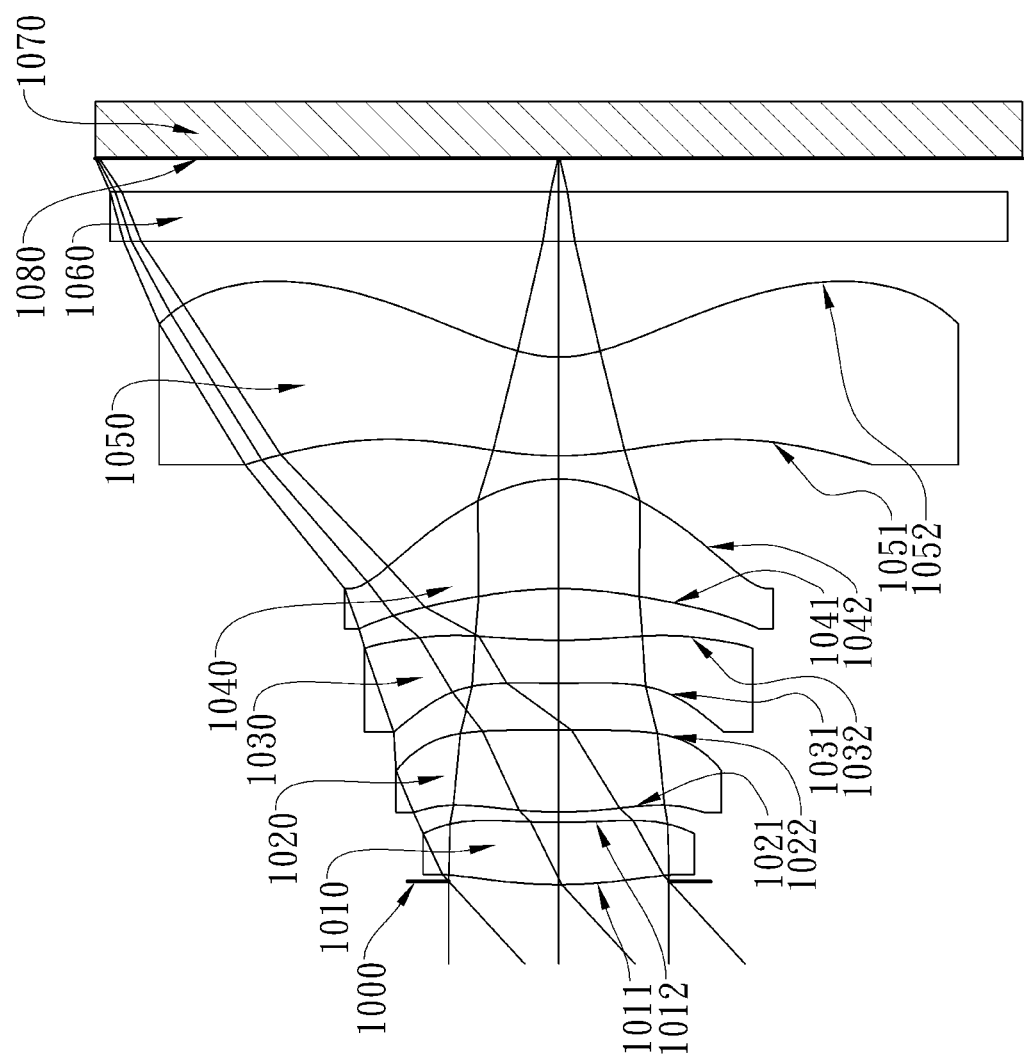
FIG. 10A shows an optical imaging lens system in accordance with the tenth embodiment of the present disclosure.
Figure 10B:
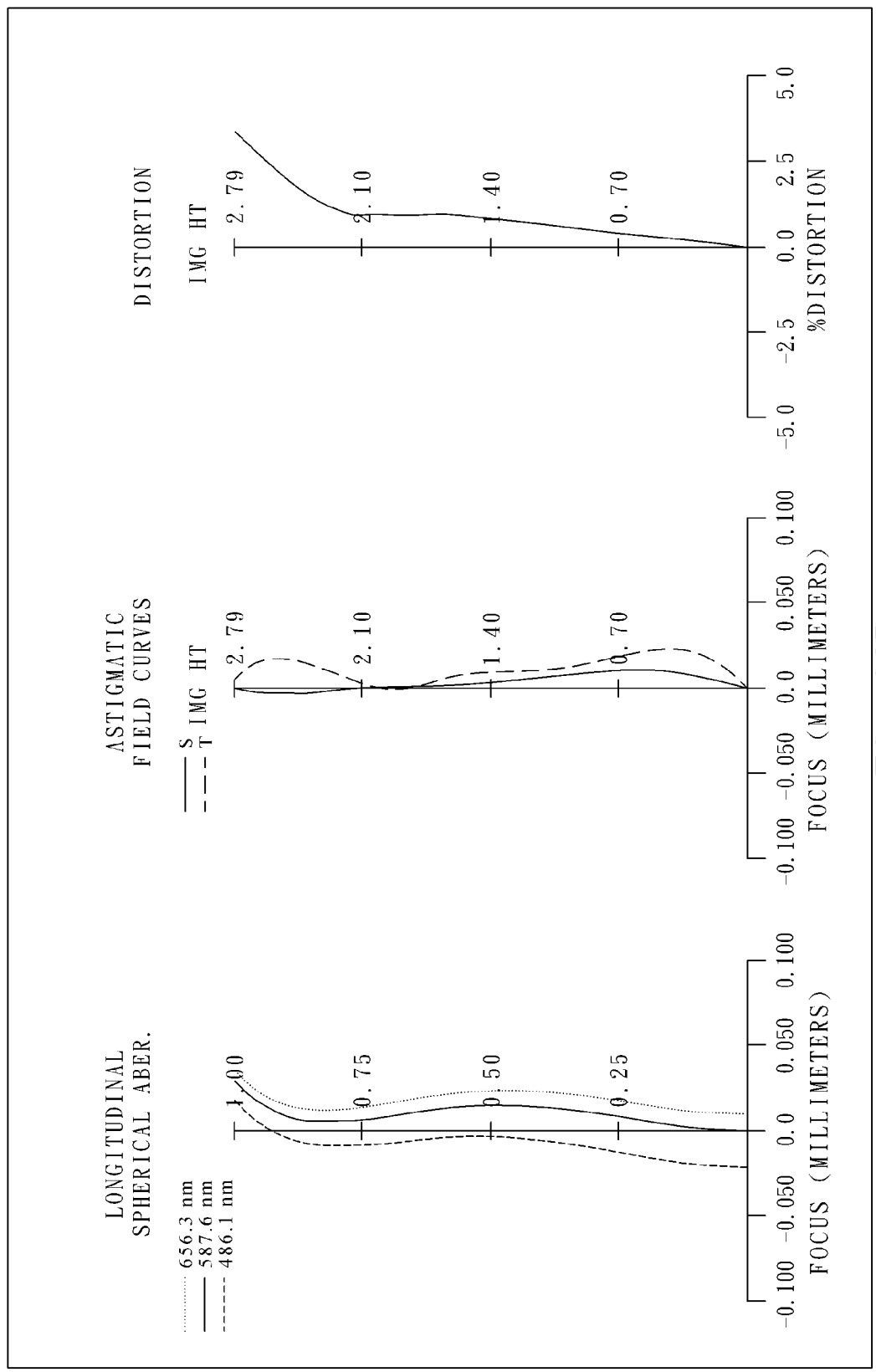
FIG. 10B shows the aberration curves of the tenth embodiment of the present disclosure.

FIG. 10A shows an optical imaging lens system in accordance with the tenth embodiment of the present disclosure, and FIG. 10B shows the aberration curves of the tenth embodiment of the present disclosure. The optical imaging lens system of the tenth embodiment of the present disclosure comprises five lens elements, in order from an object side to an image side:

a first lens element 1010 made of plastic with positive refractive power having a convex object-side surface 1011 and a convex image-side surface 1012, the object-side and image-side surfaces 1011 and 1012 thereof being aspheric;

a second lens element 1020 made of plastic with positive refractive power having a convex object-side surface 1021 and a concave image-side surface 1022, the object-side and image-side surfaces 1021 and 1022 thereof being aspheric;

a third lens element 1030 made of plastic with negative refractive power having a convex object-side surface 1031 and a concave image-side surface 1032, the object-side and image-side surfaces 1031 and 1032 thereof being aspheric;

a fourth lens element 1040 made of plastic with positive refractive power having a concave object-side surface 1041 and a convex image-side surface 1042, the object-side and image-side surfaces 1041 and 1042 thereof being aspheric; and a fifth lens element 1050 made of plastic with negative refractive power having a convex object-side surface 1051 and a concave image-side surface 1052, the object-side and image-side surfaces 1051 and 1052 thereof being aspheric, and at least one inflection point is formed on both the object-side surface 1051 and the image-side surface 1052 thereof;

wherein an aperture stop 1000 is disposed between an imaged object and the first lens element 1010;

the optical imaging lens system further comprises an IR filter 1060 disposed between the image-side surface 1052 of the fifth lens element 1050 and an image plane 1080, and the IR filter 1060 is made of glass and has no influence on the focal length of the optical imaging lens system; the optical imaging lens system further comprises an image sensor 1070 provided on the image plane 1080.

The detailed optical data of the tenth embodiment is shown in TABLE 27, and the aspheric surface data is shown in TABLE 28, wherein the units of the curvature radius, the thickness and the focal length are expressed in mm, and HFOV is half of the maximal field of view.

TABLE 27

(Embodiment 10)
f = 2.93 mm, Fno = 2.20, HFOV = 42.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.020 | | | | |
| 2 | Lens 1 | 2.779 ASP | 0.377 | Plastic | 1.530 | 55.8 | 14.25 |
| 3 | | 4.191 ASP | 0.063 | | | | |
| 4 | Lens 2 | 2.481 ASP | 0.495 | Plastic | 1.543 | 56.5 | 4.67 |
| 5 | | 100.000 ASP | 0.285 | | | | |
| 6 | Lens 3 | 10.204 ASP | 0.260 | Plastic | 1.634 | 23.8 | −7.72 |

TABLE 27-continued (Embodiment 10)
f = 2.93 mm, Fno = 2.20, HFOV = 42.6 deg.

| Surface # | | Curvature Radius | | Thickness | Material | Index | Abbe # | Focal length |
|---|---|---|---|---|---|---|---|---|
| 7 | | 3.275 | ASP | 0.313 | | | | |
| 8 | Lens 4 | -2.237 | ASP | 0.665 | Plastic | 1.535 | 56.3 | 2.31 |
| 9 | | -0.879 | ASP | 0.140 | | | | |
| 10 | Lens 5 | 1.888 | ASP | 0.599 | Plastic | 1.530 | 55.8 | -3.09 |
| 11 | | 0.780 | ASP | 0.700 | | | | |
| 12 | IR-filter | Plano | | 0.300 | Glass | 1.517 | 64.2 | — |
| 13 | | Plano | | 0.204 | | | | |
| 14 | Image | Plano | | — | | | | |

* Reference wavelength is d-line 587.6 nm

TABLE 28

Aspheric Coefficients

| Surface # | 2 | 3 | 4 | 5 | 6 |
|---|---|---|---|---|---|
| k = | -3.5816E+01 | -1.0000E+00 | -4.6481E+00 | -1.0000E+00 | -5.0000E+01 |
| A4 = | 1.2380E-01 | -2.9479E-01 | -1.6812E-01 | -1.2179E-01 | -3.8582E-01 |
| A6 = | -4.0701E-01 | -2.3300E-02 | -1.0272E-01 | -1.3864E-01 | -1.0099E-01 |
| A8 = | 5.4153E-01 | -2.8283E-01 | 3.7407E-02 | 1.6152E-01 | -1.8800E-01 |
| A10 = | -7.4481E-01 | 4.8460E-01 | -4.8705E-01 | -6.0514E-01 | 6.5360E-01 |
| A12 = | 3.9776E-01 | -2.5419E-01 | 8.4540E-01 | 6.6689E-01 | -3.1867E-01 |
| A14 = | -3.2414E-02 | 1.1862E-01 | -3.3908E-01 | -2.3142E-01 | |

| Surface # | 7 | 8 | 9 | 10 | 11 |
|---|---|---|---|---|---|
| k = | -1.4293E+01 | -2.7985E+00 | -2.4737E+00 | -1.6692E+00 | -4.0233E+00 |
| A4 = | -1.3866E-01 | 1.0078E-01 | -1.7744E-01 | -6.3043E-02 | -7.5911E-02 |
| A6 = | -1.1504E-01 | 2.8313E-02 | 1.9729E-01 | -4.8655E-04 | 3.0730E-02 |
| A8 = | 1.7173E-01 | -2.5245E-01 | -1.7421E-01 | 6.3949E-03 | -9.4196E-03 |
| A10 = | -2.9832E-02 | 2.6505E-01 | 7.1395E-02 | -1.0967E-03 | 1.6572E-03 |
| A12 = | -1.6793E-02 | -1.1504E-01 | 8.5935E-03 | -7.8141E-05 | -1.4978E-04 |
| A14 = | | 1.7629E-02 | -6.1644E-03 | 2.1902E-05 | 4.9898E-06 |

The equation of the aspheric surface profiles of the tenth embodiment has the same form as that of the first embodiment. Moreover, the description of the factors in the relations is as those set forth in the first embodiment, but the values of the relations of the tenth embodiment are listed in the following TABLE 29.

TABLE 29

(Embodiment 10)

| f | 2.93 | R8/f | -0.30 |
|---|---|---|---|
| Fno | 2.20 | R10/f | 0.27 |
| HFOV [deg.] | 42.6 | (SD52-SD42)/TD | 0.35 |
| V1-V3 | 32.0 | Yp52/SD52 | 0.71 |
| T34/T23 | 1.10 | TTL [mm] | 4.30 |
| ΣCT/TD | 0.75 | TTL/ImgH | 1.54 |

Embodiment 11

Figure 11A:
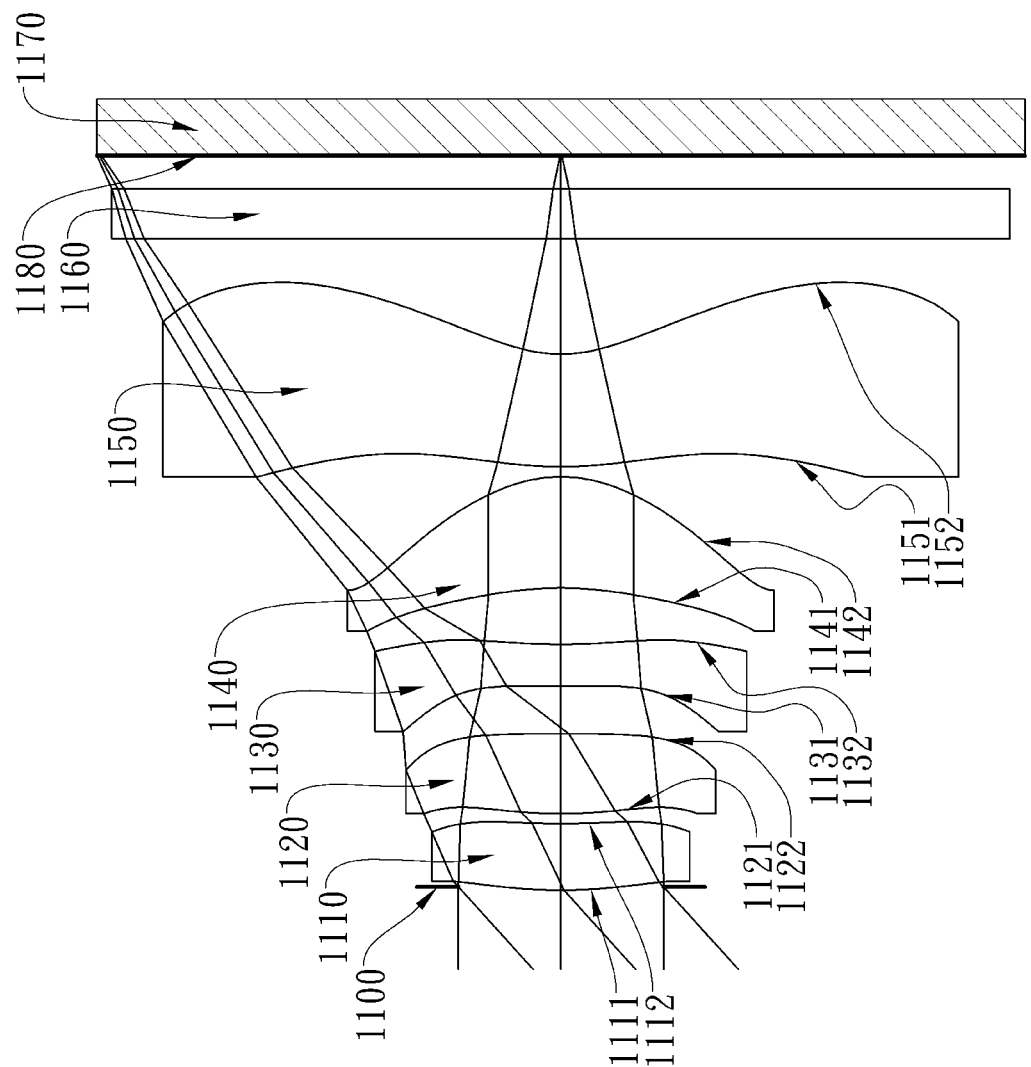
FIG. 11A shows an optical imaging lens system in accordance with the eleventh embodiment of the present disclosure.
Figure 11B:
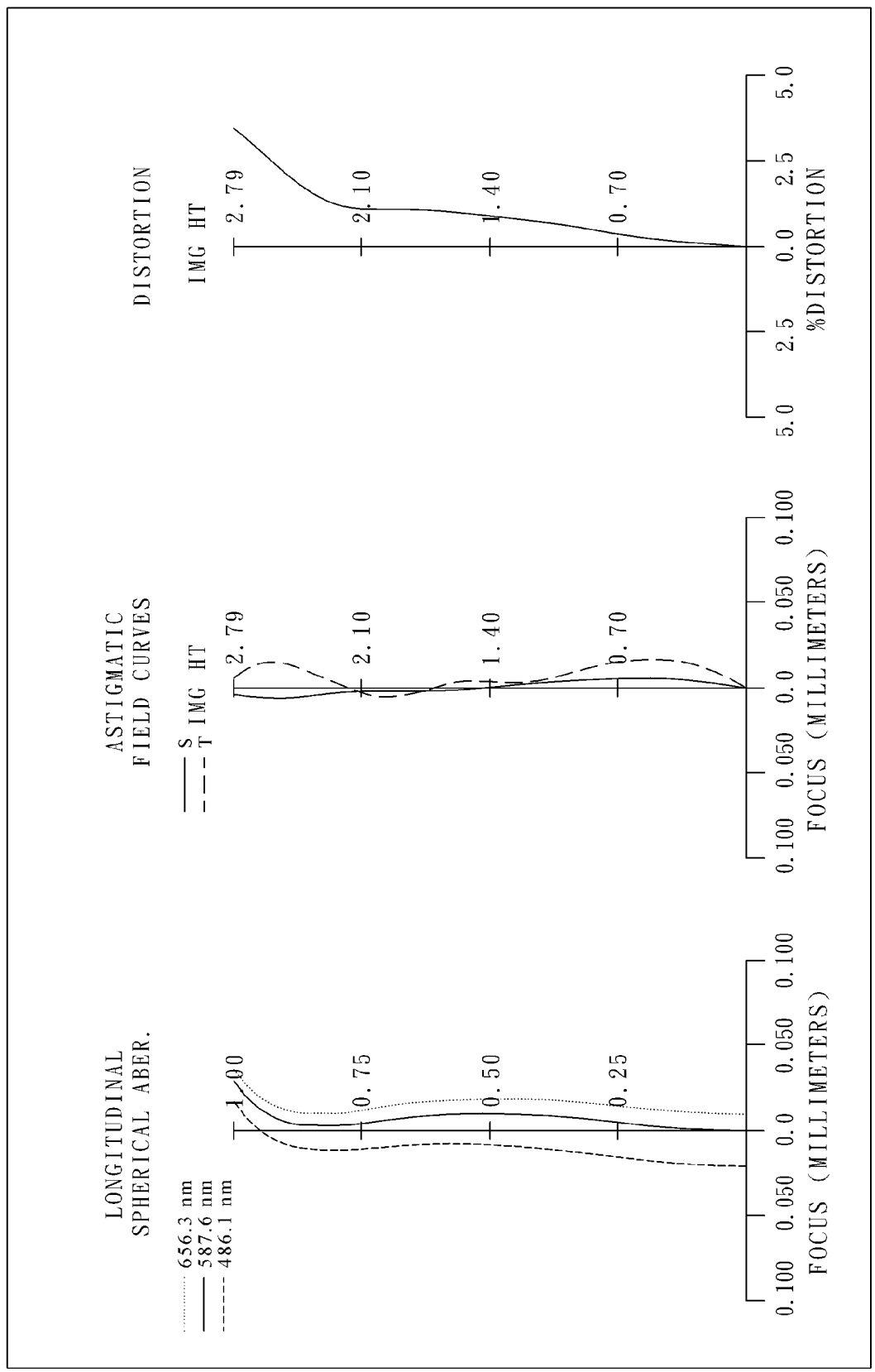
FIG. 11B shows the aberration curves of the eleventh embodiment of the present disclosure.

FIG. 11A shows an optical imaging lens system in accordance with the eleventh embodiment of the present disclosure, and FIG. 11B shows the aberration curves of the eleventh embodiment of the present disclosure. The optical imaging lens system of the eleventh embodiment of the present disclosure comprises five lens elements, in order from an object side to an image side:

a first lens element 1110 made of glass with positive refractive power having a convex object-side surface 1111 and a concave image-side surface 1112, the object-side and image-side surfaces 1111 and 1112 thereof being aspheric;

a second lens element 1120 made of plastic with positive refractive power having a convex object-side surface 1121 and a convex image-side surface 1122, the object-side and image-side surfaces 1121 and 1122 thereof being aspheric;

a third lens element 1130 made of plastic with negative refractive power having a convex object-side surface 1131 and a concave image-side surface 1132, the object-side and image-side surfaces 1131 and 1132 thereof being aspheric;

a fourth lens element 1140 made of plastic with positive refractive power having a concave object-side surface 1141 and a convex image-side surface 1142, the object-side and image-side surfaces 1141 and 1142 thereof being aspheric; and a fifth lens element 1150 made of plastic with negative refractive power having a convex object-side surface 1151 and a concave image-side surface 1152, the object-side and image-side surfaces 1151 and 1152 thereof being aspheric, and at least one inflection point is formed on both the object-side surface 1151 and the image-side surface 1152 thereof;

wherein an aperture stop 1100 is disposed between an imaged object and the first lens element 1110;

the optical imaging lens system further comprises an IR filter 1160 disposed between the image-side surface 1152 of the fifth lens element 1150 and an image plane 1180, and the IR filter 1160 is made of glass and has no influence on the focal length of the optical imaging lens system; the optical imaging lens system further comprises an image sensor 1170 provided on the image plane 1180.

The detailed optical data of the eleventh embodiment is shown in TABLE 30, and the aspheric surface data is shown in TABLE 31, wherein the units of the curvature radius, the thickness and the focal length are expressed in mm, and HFOV is half of the maximal field of view.

TABLE 30

(Embodiment 11)
f = 2.98 mm, Fno = 2.40, HFOV = 42.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.020 | | | | |
| 2 | Lens 1 | 2.909 ASP | 0.403 | Glass | 1.569 | 56.1 | 13.97 |
| 3 | | 4.357 ASP | 0.060 | | | | |
| 4 | Lens 2 | 2.518 ASP | 0.484 | Plastic | 1.543 | 56.5 | 4.40 |
| 5 | | −44.444 ASP | 0.289 | | | | |
| 6 | Lens 3 | 11.547 ASP | 0.253 | Plastic | 1.634 | 23.8 | −7.37 |
| 7 | | 3.298 ASP | 0.342 | | | | |
| 8 | Lens 4 | −2.116 ASP | 0.674 | Plastic | 1.530 | 55.8 | 2.28 |
| 9 | | −0.854 ASP | 0.061 | | | | |
| 10 | Lens 5 | 2.254 ASP | 0.682 | Plastic | 1.530 | 55.8 | −2.89 |
| 11 | | 0.817 ASP | 0.700 | | | | |
| 12 | IR-filter | Plano | 0.300 | Glass | 1.517 | 64.2 | — |
| 13 | | Plano | 0.204 | | | | |
| 14 | Image | Plano | — | | | | |

* Reference wavelength is d-line 587.6 nm

TABLE 31

Aspheric Coefficients

| Surface # | 2 | 3 | 4 | 5 | 6 |
|---|---|---|---|---|---|
| k = | −3.8400E+01 | −1.0000E+00 | −5.1820E+00 | −1.0000E+00 | −5.0000E+01 |
| A4 = | 1.1242E−01 | −2.9642E−01 | −1.7417E−01 | −1.2281E−01 | −4.0489E−01 |
| A6 = | −4.0906E−01 | −2.9212E−02 | −1.1832E−01 | −1.4618E−01 | −9.9765E−02 |
| A8 = | 5.9949E−01 | −2.7431E−01 | 2.2519E−02 | 1.4674E−01 | −1.9481E−01 |
| A10 = | −8.2047E−01 | 5.0119E−01 | −4.8501E−01 | −6.0701E−01 | 6.5524E−01 |
| A12 = | 3.9776E−01 | −2.2325E−01 | 8.7918E−01 | 6.6974E−01 | −3.0822E−01 |
| A14 = | −3.2414E−02 | 1.1862E−01 | −3.3908E−01 | −2.3052E−01 | |

| Surface # | 7 | 8 | 9 | 10 | 11 |
|---|---|---|---|---|---|
| k = | −1.7053E+00 | −2.0583E+00 | −2.4792E+00 | −2.0269E+00 | −4.2237E+00 |
| A4 = | −1.4886E−01 | 1.0631E−01 | −1.7748E−01 | −6.6670E−02 | −7.7485E−02 |
| A6 = | −1.1114E−01 | 2.8015E−02 | 1.9885E−01 | 1.7253E−03 | 3.2508E−02 |
| A8 = | 1.7294E−01 | −2.5787E−01 | −1.7516E−01 | 6.5008E−03 | −1.0065E−02 |
| A10 = | −3.1104E−02 | 2.6380E−01 | 7.0287E−02 | −1.2044E−03 | 1.7730E−03 |
| A12 = | −1.5487E−02 | −1.1441E−01 | 8.3272E−03 | −8.8583E−05 | −1.5936E−04 |
| A14 = | | 1.7851E−02 | −6.0386E−03 | 2.5866E−05 | 5.2894E−06 |

The equation of the aspheric surface profiles of the eleventh embodiment has the same form as that of the first embodiment. Moreover, the description of the factors in the relations is as those set forth in the first embodiment, but the values of the relations of the eleventh embodiment are listed in the following TABLE 32.

TABLE 32

(Embodiment 11)

| f | 2.98 | R8/f | −0.29 |
|---|---|---|---|
| Fno | 2.40 | R10/f | 0.27 |
| HFOV [deg.] | 42.2 | (SD52−SD42)/TD | 0.34 |
| V1−V3 | 32.3 | Yp52/SD52 | 0.71 |
| T34/T23 | 1.18 | TTL [mm] | 4.35 |
| ΣCT/TD | 0.77 | TTL/ImgH | 1.56 |

It is to be noted that TABLES 1-32 show different data of the different embodiments, however, the data of the different embodiments are obtained from experiments. Therefore, any optical imaging lens system of the same structure is considered to be within the scope of the present disclosure even if it uses different data. The embodiments depicted above and the appended drawings are exemplary and are not intended to limit the scope of the present disclosure.

What is claimed is:

1. An optical imaging lens system having non-cemented lens elements with refractive power in a total number of five, in order from an object side to an image side:
   a first lens element with positive refractive power having a convex object-side surface;
   a second lens element with positive refractive power;
   a third lens element with negative refractive power, and both the object-side and image-side surfaces thereof being aspheric;
   a fourth lens element having a convex image-side surface, and both the object-side and image-side surfaces thereof being aspheric; and
   a plastic fifth lens element having a concave image-side surface, with both the object-side and image-side surfaces thereof being aspheric, and having at least one inflection point positioned on at least one of the object-side and image-side surfaces thereof;

wherein a maximal effective radial distance on the image-side surface of the fifth lens element is SD52, a maximal effective radial distance on the image-side surface of the fourth lens element is SD42, an axial distance between the object-side surface of the first lens element and the image-side surface of the fifth lens element is TD, an axial distance between the third lens element and the fourth lens element is T34, an axial distance between the second lens element and the third lens element is T23, a distance between a non-axial critical point of the image-side surface of the fifth lens element and the optical axis is Yp52, and they satisfy the following relations:

0.25<(SD52−SD42)/TD<0.60;

0.1<T34/T23<2.8; and 0.3<Yp52/SD52<0.95.

2. The optical imaging lens system according to claim 1, wherein the fifth lens element has negative refractive power.

3. The optical imaging lens system according to claim 2, wherein the fourth lens element has positive refractive power.

4. The optical imaging lens system according to claim 3, wherein the fourth lens element has a concave object-side surface.

5. The optical imaging lens system according to claim 4, wherein the third lens element has a concave object-side surface and a convex image-side surface.

6. The optical imaging lens system according to claim 5, wherein the second lens element has a concave object-side surface and convex image-side surface.

7. The optical imaging lens system according to claim 2, wherein an Abbe number of the first lens element is V1, an Abbe number of the third lens element is V3, and they satisfy the following relation:

25<V1−V3<45.

8. The optical imaging lens system according to claim 7, wherein a combined central thickness of all lens elements is ΣCT, the axial distance between the object-side surface of the first lens element and the image-side surface of the fifth lens element is TD, and they satisfy the following relation:

0.65<ΣCT/TD<0.85.

9. The optical imaging lens system according to claim 7, wherein the fifth lens element has a convex object-side surface.

10. The optical imaging lens system according to claim 4, further comprising an image plane; an axial distance between the object-side surface of the first lens element and the image plane is TTL, a maximum image height of the optical imaging lens system is ImgH, and they satisfy the following relation:

TTL/ImgH<1.6.

11. The optical imaging lens system according to claim 4, wherein a curvature radius of the image-side surface of the fifth lens element is R10, a focal length of the optical imaging lens system is f, and they satisfy the following relation:

0<R10/f<0.4.

12. The optical imaging lens system according to claim 4, wherein a maximal effective radial distance on the image-side surface of the fifth lens element is SD52, a maximal effective radial distance on the image-side surface of the fourth lens element is SD42, the axial distance between the object-side surface of the first lens element and the image-side surface of the fifth lens element is TD, and they satisfy the following relation:

0.30<(SD52−SD42)/TD<0.45.

13. The optical imaging lens system according to claim 4, wherein a curvature radius of the image-side surface of the fourth lens element is R8, a focal length of the optical imaging lens system is f, and they satisfy the following relation:

−0.58<R8/f<0.

14. The optical imaging lens system according to claim 13, wherein the third lens element has a convex image-side surface.

15. The optical imaging lens system according to claim 3, wherein half of the maximal field of view of the optical imaging lens system is HFOV, and it satisfies the following relation:

40 deg<HFOV<55 deg.

16. The optical imaging lens system according to claim 3, wherein an axial distance between the object-side surface of the first lens element and an image plane is TTL, and it satisfies the following relation:

2.5 mm<TTL<4.7 mm.

17. An optical imaging lens system having non-cemented lens elements with refractive power in a total number of five, in order from an object side to an image side:
  a first lens element with positive refractive power having a convex object-side surface;
  a second lens element with positive refractive power;
  a third lens element with both the object-side and image-side surfaces thereof being aspheric;
  a fourth lens element with positive refractive power and with both the object-side and image-side surfaces thereof being aspheric; and
  a plastic fifth lens element having a concave image-side surface, with both the object-side and image-side surfaces thereof being aspheric, and having at least one inflection point positioned on at least one of the object-side and image-side surfaces thereof;
  wherein the optical imaging lens system further comprises an image plane; an axial distance between the object-side surface of the first lens element and the image plane is TTL, a maximum image height of the optical imaging lens system is ImgH, an axial distance between the third lens element and the fourth lens element is T34, an axial distance between the second lens element and the third lens element is T23, a distance between a non-axial critical point of the image-side surface of the fifth lens element and an optical axis is Yp52, a maximal effective radial distance on the image-side surface of the fifth lens element is SD52, and they satisfy the following relations:

TTL/ImgH<1.6;

0.1<T34/T23<2.8; and 0.3<Yp52/SD52<0.95.

18. The optical imaging lens system according to claim 17, wherein the third lens element has negative refractive power, and the fifth lens element has negative refractive power.

19. The optical imaging lens system according to claim 18, wherein the fourth lens element has a concave object-side surface and a convex image-side surface.

20. The optical imaging lens system according to claim 19, wherein the fifth lens element has a convex object-side surface.

21. The optical imaging lens system according to claim 20, wherein a maximal effective radial distance on the image-side surface of the fifth lens element is SD52, a maximal effective radial distance on the image-side surface of the fourth lens element is SD42, an axial distance between the object-side surface of the first lens element and the image-side surface of the fifth lens element is TD, and they satisfy the following relation:

$0.30<(SD52-SD42)/TD<0.45$.

22. The optical imaging lens system according to claim 20, wherein half of the maximal field of view of the optical imaging lens system is HFOV, and it satisfies the following relation:

40 deg<$HFOV$<55 deg.

23. An optical imaging lens system having non-cemented lens elements with refractive power in a total number of five, in order from an object side to an image side:
   a first lens element with positive refractive power having a convex object-side surface;
   a second lens element with positive refractive power;
   a third lens element with both the object-side and image-side surfaces thereof being aspheric;
   a fourth lens element with both the object-side and image-side surfaces thereof being aspheric; and
   a plastic fifth lens element having a concave image-side surface, with both the object-side and image-side surfaces thereof being aspheric, and having at least one inflection point positioned on at least one of the object-side and image-side surfaces thereof;
   wherein half of the maximal field of view of the optical imaging lens system is HFOV, a curvature radius of the image-side surface of the fifth lens element is R10, a focal length of the optical imaging lens system is f, a distance between a non-axial critical point of the image-side surface of the fifth lens element and an optical axis is Yp52, a maximal effective radial distance on the image-side surface of the fifth lens element is SD52, and they satisfy the following relations:

40 deg<$HFOV$<55 deg;

$0<R10/f<0.4$; and $0.3<Yp52/SD52<0.95$.

24. The optical imaging lens system according to claim 23, wherein a maximal effective radial distance on the image-side surface of the fifth lens element is SD52, a maximal effective radial distance on the image-side surface of the fourth lens element is SD42, an axial distance between the object-side surface of the first lens element and the image-side surface of the fifth lens element is TD, and they satisfy the following relations:

$0.25<(SD52-SD42)/TD<0.60$.

25. The optical imaging lens system according to claim 24, wherein a maximal effective radial distance on the image-side surface of the fifth lens element and the optical axis is SD52, a maximal effective radial distance on the image-side surface of the fourth lens element is SD42, the axial distance between the object-side surface of the first lens element and the image-side surface of the fifth lens element is TD, and they satisfy the following relations:

$0.30<(SD52-SD42)/TD<0.45$.

* * * * *